US012749446B2

(12) United States Patent
Lee et al.

(10) Patent No.: US 12,749,446 B2
(45) Date of Patent: Sep. 29, 2026

(54) STAGE, DISPLAY DEVICE INCLUDING THE SAME AND ELECTRONIC DEVICE INCLUDING THE SAME

(71) Applicant: Samsung Display Co., LTD., Yongin-si (KR)

(72) Inventors: Se Hyun Lee, Yongin-si (KR); Kyung Hoon Chung, Yongin-si (KR); Kwi Hyun Kim, Yongin-si (KR); Ji Sun Kim, Yongin-si (KR); Sun Hwa Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/173,698

(22) Filed: Apr. 8, 2025

(65) Prior Publication Data

US 2026/0018126 A1 Jan. 15, 2026

(30) Foreign Application Priority Data

Jul. 12, 2024 (KR) ........................ 10-2024-0092438

(51) Int. Cl.
*G09G 3/3233* (2016.01)
*G09G 3/20* (2006.01)
*G09G 3/3266* (2016.01)

(52) U.S. Cl.
CPC ......... *G09G 3/3233* (2013.01); *G09G 3/2092* (2013.01); *G09G 3/3266* (2013.01); (Continued)

(58) Field of Classification Search
CPC .. G09G 3/2092; G09G 3/3233; G09G 3/3266; G09G 2300/0819; G09G 2300/842; G09G 2300/861; G09G 2310/0202; G09G 2310/0243; G09G 2310/0262; G09G 2310/0267; G09G 2310/0275; (Continued)

(56) References Cited

U.S. PATENT DOCUMENTS

2013/0027377 A1* 1/2013 Yang .................... G09G 3/3677 345/212
2016/0104449 A1* 4/2016 Huang ................. G11C 19/287 377/64

(Continued)

FOREIGN PATENT DOCUMENTS

KR 10-2021-0106125 A 8/2021

*Primary Examiner* — Cory A Almeida
(74) *Attorney, Agent, or Firm* — Womble Bond Dickinson (US) LLP

(57) ABSTRACT

A stage includes a node controller controlling a voltage of a first control node and a second control node, according to a first input signal, a second input signal, and a third input signal, a node maintenance unit maintaining the voltage of the first control node constant, according to a first selection signal and the voltage of the second control node, and an output unit supplying a first gate voltage supplied to a first power terminal or a second gate voltage supplied to a second power terminal to an output terminal, according to a second selection signal, the voltage of the first control node, and the voltage of the second control node, the first selection signal is the second input signal or a signal having the first gate voltage, and the second selection signal is the third input signal or a signal having the second gate voltage.

20 Claims, 14 Drawing Sheets

(52) U.S. Cl.
CPC ............... *G09G 2300/0819* (2013.01); *G09G 2300/0842* (2013.01); *G09G 2300/0861* (2013.01); *G09G 2310/0202* (2013.01); *G09G 2310/0243* (2013.01); *G09G 2310/0262* (2013.01); *G09G 2310/0267* (2013.01); *G09G 2310/0275* (2013.01); *G09G 2310/0286* (2013.01); *G09G 2320/0626* (2013.01); *G09G 2330/02* (2013.01)

(58) Field of Classification Search
CPC ... G09G 2310/0286; G09G 2320/0626; G09G 2330/02
See application file for complete search history.

(56) References Cited

U.S. PATENT DOCUMENTS

| | | | | |
|---|---|---|---|---|
| 2020/0133327 | A1* | 4/2020 | Lee | G06F 1/08 |
| 2020/0372851 | A1* | 11/2020 | Kim | G09G 3/2092 |
| 2021/0407381 | A1* | 12/2021 | Park | G09G 3/32 |
| 2023/0009494 | A1* | 1/2023 | Noh | G09G 3/3266 |
| 2023/0351972 | A1* | 11/2023 | In | G09G 3/3233 |

* cited by examiner

STAGE, DISPLAY DEVICE INCLUDING THE SAME AND ELECTRONIC DEVICE INCLUDING THE SAME

CROSS-REFERENCE TO RELATED APPLICATION

The present application claims priority to and the benefit of Korean Patent Application No. 10-2024-0092438, filed on Jul. 12, 2024, in the Korean Intellectual Property Office, the entire disclosure of which is incorporated herein by reference.

BACKGROUND

1. Field

Aspects of some embodiments of the present disclosure relate to a stage, a display device including the stage, and an electronic device including the same.

2. Description of the Related Art

A display device displays images using pixels located in a display unit. The pixels are connected to scan lines and data lines, and are driven by a scan signal and a data signal supplied from the scan lines and the data lines.

The pixels may be further connected to emission control lines, and an emission period of the pixels may be controlled using an emission control signal supplied to the emission control lines. In this case, the display device includes an emission control driver for generating the emission control signal.

The emission control driver includes stages for supplying respective emission control signals to the emission control lines. The stages output a second gate voltage to the emission control line connected to corresponding pixels during the emission period of the pixels positioned on each horizontal line, and output the emission control signal of a first gate voltage to the emission control line in other periods to block light emission of the pixels. Meanwhile, the emission control driver may be utilized to adjust a duty of the emission control signal according to a low luminance mode and a high luminance mode.

The above information disclosed in this Background section is only for enhancement of understanding of the background and therefore the information discussed in this Background section does not necessarily constitute prior art.

SUMMARY

Aspects of some embodiments of the present disclosure relate to a stage, a display device including the stage, and an electronic device including the same. For example, aspects of some embodiments relate to a stage for supplying an emission control signal to pixels, a display device including the stage, and an electronic device including the same.

Aspects of some embodiments of the present disclosure include a display device that adjusts a duty of an emission control signal according to a low luminance mode and a high luminance mode.

According to some embodiments of the present disclosure, a stage may include a node controller controlling a voltage of a first control node and a voltage of a second control node, according to a first input signal, a second input signal, and a third input signal, a node maintenance unit maintaining the voltage of the first control node constant, according to a first selection signal and the voltage of the second control node, and an output unit supplying a first gate voltage supplied to a first power terminal or a second gate voltage supplied to a second power terminal to an output terminal, according to a second selection signal, the voltage of the first control node, and the voltage of the second control node, the first selection signal may be one of the second input signal or a signal having the first gate voltage, and the second selection signal may be one of the third input signal or a signal having the second gate voltage.

According to some embodiments, in a low luminance mode, the first selection signal may be the second input signal, and the second selection signal may be the third input signal.

According to some embodiments, in a high luminance mode, the first selection signal may be the signal having the first gate voltage, and the second selection signal may be the signal having the second gate voltage.

According to some embodiments, the first input signal may be supplied to a first input terminal, the second input signal may be supplied to a second input terminal, the third input signal may be supplied to a third input terminal, the first selection signal may be supplied to a fourth input terminal, the second selection signal may be supplied to a fifth input terminal, and the node controller may include a first transistor connected between the first input terminal and the second control node and including a first electrode connected to the first input terminal, a second transistor connected between the first power terminal and the third input terminal and including a first electrode connected to the first power terminal, and a short-circuit prevention transistor connected between the first transistor and the second transistor, and including a first electrode connected to a second electrode of the second transistor and a second electrode connected to a second electrode of the first transistor.

According to some embodiments, the node controller may further include a third transistor including a first electrode connected to the second electrode of the second transistor, a second electrode connected to the third input terminal, and a gate electrode connected to the second control node, a fourth transistor including a first electrode connected to a gate electrode of the second transistor, a second electrode connected to the second input terminal, and a gate electrode connected to the second electrode of the first transistor, a fifth transistor including a first electrode connected to the first electrode of the fourth transistor, a second electrode connected to the second power terminal, and a gate electrode connected to the second input terminal, a first coupling transistor including a first electrode connected to the first electrode of the fifth transistor, a second electrode, and a gate electrode connected to the second power terminal, a first coupling capacitor including a first electrode connected to the second electrode of the first coupling transistor, and a second electrode, a sixth transistor including a first electrode connected to the first control node, a second electrode connected to the second electrode of the coupling capacitor, and a gate electrode connected to the third input terminal, and a seventh transistor including a first electrode connected to the second electrode of the first coupling capacitor, a second electrode connected to the third input terminal, and a gate electrode connected to the first electrode of the first coupling capacitor.

According to some embodiments, the node controller may further include a second coupling capacitor including a first electrode connected to the second electrode of the second transistor and a second electrode connected to the gate electrode of the third transistor, and a second coupling transistor connected between the second electrode of the first transistor and the second control node, and turned on according to the second gate voltage.

According to some embodiments, the node maintenance unit may include an eighth transistor including a first electrode connected to the fourth input terminal, a second electrode connected to the first control node, and a gate electrode connected to the second electrode of the first transistor, and a first capacitor including a first electrode connected to the first power terminal and a second electrode connected to the first control node.

According to some embodiments, the output unit may include a pull-up transistor including a first electrode connected to the first power terminal, a second electrode connected to the output terminal, and a gate electrode connected to the first control node, and a pull-down transistor including a first electrode connected to the output terminal, a second electrode connected to the fifth input terminal, and a gate electrode connected to the second control node.

According to some embodiments, the first gate voltage may be set to a gate-off voltage and the second gate voltage may be set to a gate-on voltage.

According to some embodiments, the first input signal may be a start pulse or an output signal of a previous stage, and the second input signal and the third input signal may be a first clock signal and a second clock signal, respectively.

According to some embodiments, the first clock signal and the second clock signal may alternately have a gate-on voltage, and the start pulse or the output signal of the previous stage may be supplied so as to overlap at least one gate-on voltage period of the first clock signal.

According to some embodiments of the present disclosure, a display device may include pixels connected to scan lines, data lines, and emission control lines, a scan driver for supplying a scan signal to the scan lines, a data driver for supplying a data signal to the data lines, and an emission control driver including a plurality of stages for supplying an emission control signal to the emission control lines, each of the stages may include a node controller controlling a voltage of a first control node and a voltage of a second control node, according to a first input signal supplied to a first input terminal, a second input signal supplied to a second input terminal, and a third input signal supplied to a third input terminal, and including a first transistor connected between the first input terminal and the second control node and including a first electrode connected to the first input terminal, and a second transistor connected between a first power terminal and the third input terminal and including a first electrode connected to the first power terminal, a node maintenance unit maintaining the voltage of the first control node constant according to a first selection signal supplied to a fourth input terminal and the voltage of the second control node, and including an eighth transistor including a first electrode connected to the fourth input terminal, a second electrode connected to the first control node, and a gate electrode connected to a second electrode of the first transistor, and an output unit supplying a first gate voltage supplied to the first power terminal or a second gate voltage supplied to the second power terminal to an output terminal, according to a second selection signal supplied to a fifth input terminal, the voltage of the first control node, and the voltage of the second control node, the first selection signal may be one of the second input signal or a signal having the first gate voltage, and the second selection signal may be one of the third input signal or a signal having the second gate voltage.

According to some embodiments, in a low luminance mode, the first selection signal may be the second input signal, and the second selection signal may be the third input signal.

According to some embodiments, in a high luminance mode, the first selection signal may be the signal having the first gate voltage, and the second selection signal may be the signal having the second gate voltage.

According to some embodiments, the node controller may further include a short-circuit prevention transistor connected between the first transistor and the second transistor, and including a first electrode connected to a second electrode of the second transistor and a second electrode connected to the second electrode of the first transistor, a third transistor including a first electrode connected to the second electrode of the second transistor, a second electrode connected to the third input terminal, and a gate electrode connected to the second control node, a fourth transistor including a first electrode connected to a gate electrode of the second transistor, a second electrode connected to the second input terminal, and a gate electrode connected to the second electrode of the first transistor, a fifth transistor including a first electrode connected to the first electrode of the fourth transistor, a second electrode connected to the second power terminal, and a gate electrode connected to the second input terminal, a first coupling transistor including a first electrode connected to the first electrode of the fifth transistor, a second electrode, and a gate electrode connected to the second power terminal, a first coupling capacitor including a first electrode connected to the second electrode of the first coupling transistor, and a second electrode, a sixth transistor including a first electrode connected to the first control node, a second electrode connected to the second electrode of the first coupling capacitor, and a gate electrode connected to the third input terminal, and a seventh transistor including a first electrode connected to the second electrode of the first coupling capacitor, a second electrode connected to the third input terminal, and a gate electrode connected to the first electrode of the first coupling capacitor.

According to some embodiments, the node controller may further include a second coupling capacitor including a first electrode connected to the second electrode of the second transistor and a second electrode connected to the gate electrode of the third transistor, and a second coupling transistor connected between the second electrode of the first transistor and the second control node, and turned on according to the second gate voltage.

According to some embodiments, the node maintenance unit may further include a first capacitor including a first electrode connected to the first power terminal and a second electrode connected to the first control node.

According to some embodiments, the output unit may include a pull-up transistor including a first electrode connected to the first power terminal, a second electrode connected to the output terminal, and a gate electrode connected to the first control node.

According to some embodiments, the first gate voltage may be set to a gate-off voltage and the second gate voltage may be set to a gate-on voltage.

According to some embodiments, the first input signal may be a start pulse or an output signal of a previous stage, and the second input signal and the third input signal may be a first clock signal and a second clock signal, respectively.

In a stage of according to some embodiments of the present disclosure and a display device including the same, a duty of an emission control signal may be adjusted according to a low luminance mode and a high luminance mode.

A stage according to some embodiments of the present disclosure and a display device including the stage, and an electronic device including the same may accurately express a low luminance and relatively improve light emission efficiency of a pixel.

However, the characteristics of embodiments according to the present disclosure are not limited to the above-described effects, and may be variously expanded without departing from the spirit and scope of embodiments according to the present disclosure.

BRIEF DESCRIPTION OF THE DRAWINGS

The above and other aspects of embodiments according to the present disclosure will become more apparent by describing in further detail aspects of some embodiments thereof with reference to the accompanying drawings, in which.

DETAILED DESCRIPTION

Figure 1:
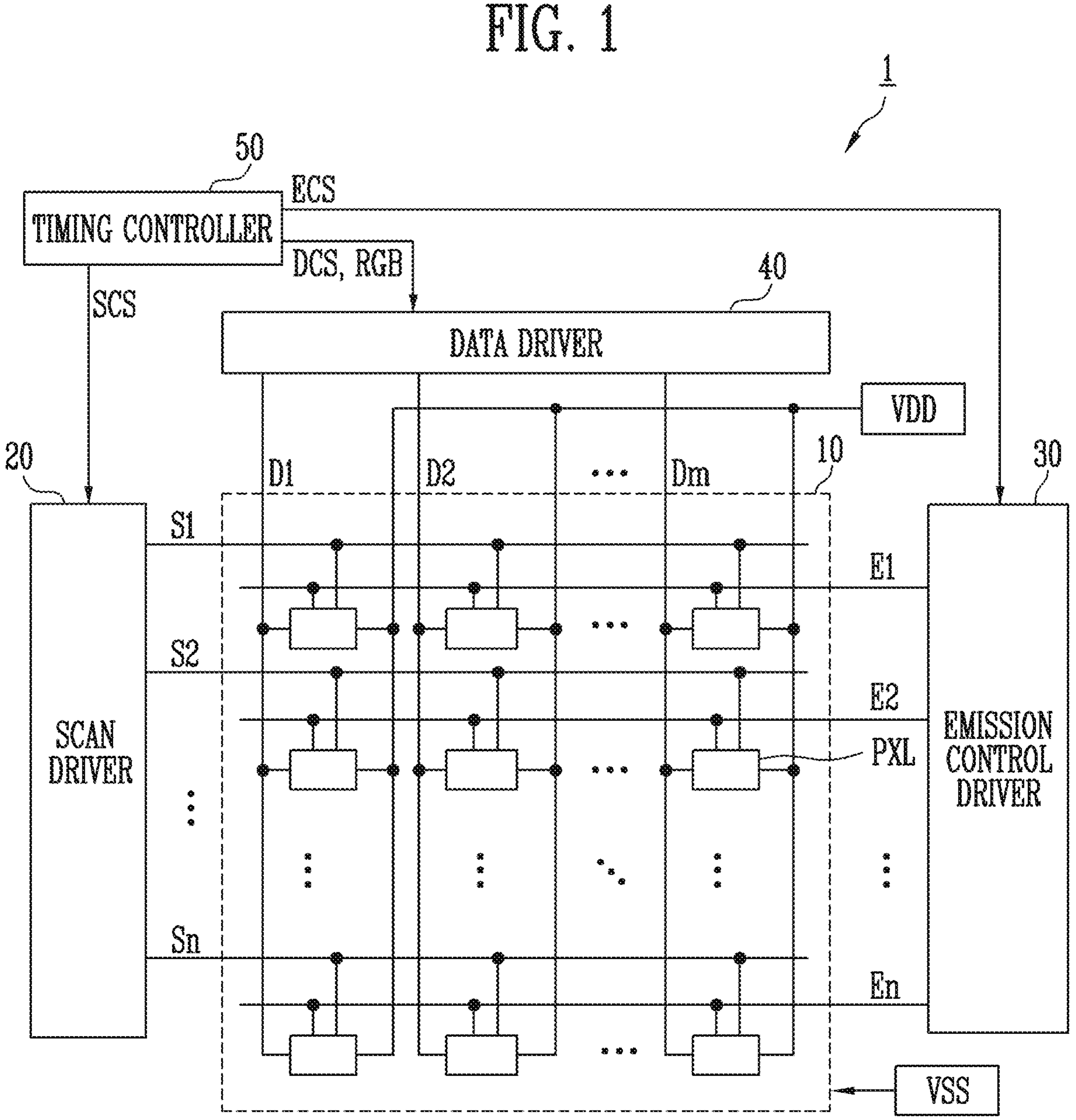
FIG. 1 illustrates a display device according to some embodiments of the present disclosure.

Hereinafter, with reference to the attached drawings, various embodiments of the present disclosure are described in detail so that those skilled in the art may easily implement the present disclosure. The present disclosure may be implemented in various different forms and is not limited to the embodiments described below.

In the drawings, a part unrelated to embodiments according to the present disclosure may be omitted to clarify a description of embodiments according to the present disclosure, and the same reference numerals are given to similar parts throughout the specification.

Throughout the specification, in a case where a certain portion "includes", the case means that the portion may further include another component without excluding another component unless otherwise stated. "At least any one of X, Y, and Z" and "at least any one selected from a group configured of X, Y, and Z" may be interpreted as one X, one Y, one Z, or any combination of two or more of X, Y, and Z (for example, XYZ, XYY, YZ, and ZZ). Here, "and/or" includes all combinations of one or more of corresponding configurations.

Here, terms such as first and second may be used to describe various components, but these components are not limited to these terms. These terms are used to distinguish one component from another component. Therefore, a first component may refer to a second component within a range without departing from the scope disclosed herein.

FIG. 1 illustrates a display device according to some embodiments of the present disclosure. FIG. 1 shows a light emitting display device including light emitting elements as an example of the display device 1, but the display device 1 according to embodiments of the present disclosure is not limited thereto. The display device 1 of FIG. 1 displays moving images (e.g., video images) or still images (e.g., static images), and may be used in an electronic device, such as a portable electronic device such as a mobile phone, a laptop, a tablet personal computer (PC), a smart phone, a mobile communication terminal, an electronic organizer, an e-book, a portable multimedia player (PMP), a navigation device, or an ultra mobile PC (UMPC). Alternatively, the display device 1 may be used in an electronic device such as a television, a monitor, a billboard, or an electronic device for the Internet of Things (IoT), or may be used in a wearable electronic device such as a smart watch, a watch phone, a display, a tablet, and a head-mounted display (HMD). In addition, the display device 1 according to some embodiments may be used in an electronic device such as instrument panel of vehicles, a center information display (CID) arranged on the center fascia or dashboard of vehicles, a room mirror display in place of side-view mirrors of vehicles, or an electronic device for a display arranged at the rear side of a front seat as an entertainment for a rear seat of vehicles.

Referring to FIG. 1, the display device 1 according to some embodiments of the present disclosure may include a display unit 10, a scan driver 20, an emission control driver 30, a data driver 40, and a timing controller 50 for driving the display unit 10.

The display unit 10 may include scan lines S1 to Sn, emission control lines E1 to En, and pixels PXL connected to data lines D1 to Dm. In describing embodiments of the present disclosure, a "connection" may comprehensively mean an electrical connection and/or a physical connection. For example, the pixels PXL may be electrically connected to the scan lines S1 to Sn, the emission control lines E1 to En, and the data lines D1 to Dm.

The pixels PXL may receive respective scan signal, emission control signal, and data signal from the scan lines S1 to Sn, the emission control lines E1 to En, and the data lines D1 to Dm. In addition, the pixels PXL may further receive driving power such as first pixel power VDD and second pixel power VSS.

The pixels PXL may receive respective data signals from the data lines D1 to Dm when respective scan signals are supplied from the scan lines S1 to Sn, and emit light with a luminance corresponding to the data signal. Accordingly, an image corresponding to the data signal of each frame may be displayed on the display unit 10.

Each pixel PXij may include a light emitting element and a pixel circuit for driving the light emitting element. The pixel PXij may be located on an i-th (i is a natural number) horizontal line and a j-th (j is a natural number) vertical line of the display unit 10, and may be connected to an i-th scan line Si, an i-th emission control line Ei, and a j-th data line Dj.

The pixel circuit controls a driving current flowing from the first pixel power VDD to the second pixel power VSS via the light emitting element according to the data signal.

The scan driver 20 may receive a scan driving control signal SCS from the timing controller 50 and supply the scan signal to the scan lines S1 to Sn according to the scan driving control signal SCS. For example, the scan driver 20 may sequentially supply the scan signal to the scan lines S1 to Sn. When the scan signal is sequentially supplied to the scan lines S1 to Sn, the pixels PXL are selected in a horizontal line unit according to each scan signal.

The scan signal may be used to select the pixels PXL in the horizontal line unit. For example, the scan signal may have a second gate voltage (for example, a logic low level) at which a transistor of each pixel PXij connected to the data lines D1 to Dm may be turned on, and may be supplied to the pixels located on a corresponding horizontal line in each horizontal period.

The pixels PXL receiving the scan signal may be connected to the data lines D1 to Dm during a period in which the scan signal is supplied, and thus receive each data signal. That is, the scan signal may be supplied to transmit the data signal to the pixels PXL.

The emission control driver 30 may receive an emission driving control signal ECS from the timing controller 50 and supply an emission control signal to the emission control lines E1 to En according to the emission driving control signal ECS. For example, the emission control driver 30 may sequentially supply the emission control signal to the emission control lines E1 to En.

The emission control signal may be used to control an emission period (for example, an emission time point and/or an emission duration) of the pixels PXL in the horizontal line unit. For example, the emission control signal may have a first gate voltage (gate-off voltage, for example, a logic high level) at which at least one transistor located on a current path of each of the pixels PXL may be turned off. In this case, the pixel PXij receiving the emission control signal may be set to a non-emission state during a period in which the emission control signal is supplied, and may be set to an emission state during other periods. Meanwhile, when a data signal corresponding to a black grayscale is supplied to a specific pixel PXij, the pixel PXij may maintain the non-emission state according to the data signal even though the emission control signal is not supplied.

The data driver 40 may receive a data driving control signal DCS and image data RGB from the timing controller 50, and supply the data signal to the data lines D1 to Dm according to the data driving control signal DCS and the image data RGB. The data signal supplied to the data lines D1 to Dm is supplied to the pixels PXL selected by the scan signal. To this end, the data driver 40 may supply the data signal to the data lines D1 to Dm to be synchronized with each scan signal. For example, the data driver 40 may output the data signal corresponding to the pixels PXL of the corresponding horizontal line to the data lines D1 to Dm to be synchronized with the scan signal for each horizontal period.

The timing controller 50 receives various control signals (for example, vertical/horizontal synchronization signals, a main clock signal, and the like) from the outside (for example, a host processor), and generates the scan driving control signals SCS, the emission driving control signal ECS, and the data driving control signal DCS according to the control signals. The scan driving control signal SCS, the emission driving control signal ECS, and the data driving control signal DCS may be supplied to the scan driver 20, the emission control driver 30, and the data driver 40, respectively.

The scan driving control signal SCS may include a start pulse and clock signals. The start pulse controls an output timing of a first scan signal (for example, a scan signal supplied to the first scan line S1), and the clock signals are used to shift the start pulse.

The emission driving control signal ECS includes a start pulse and clock signals. The start pulse controls an output timing of a first emission control signal (for example, an emission control signal supplied to the first emission control line E1), and the clock signals are used to shift the start pulse.

The data driving control signal DCS includes a source start pulse and clock signals. The source start pulse controls a sampling start time point of data, and the clock signals are used to control a sampling operation.

In addition, the timing controller 50 receives input image data from the outside, rearranges the input image data, and generates the image data RGB. The timing controller 50 may supply the image data RGB to the data driver 40.

Figure 2:
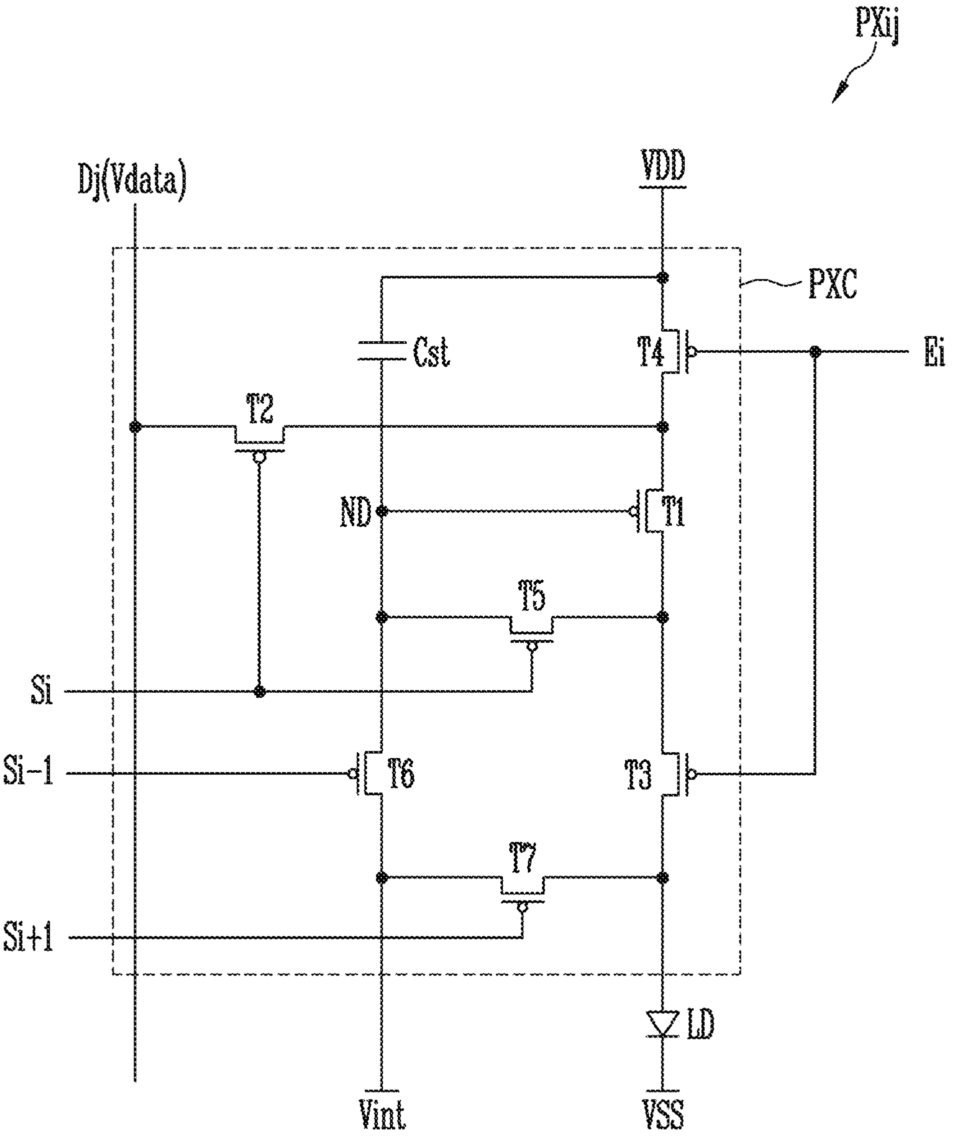
FIG. 2 illustrates a pixel according to some embodiments of the present disclosure.

FIG. 2 illustrates a pixel according to some embodiments of the present disclosure. Although FIG. 2 illustrates various components in a pixel according to some embodiments, embodiments according to the present disclosure are not limited thereto, and according to various embodiments the pixel may include additional components or fewer components without departing from the spirit and scope of embodiments according to the present disclosure.

Referring to FIG. 2, the pixel PXij may be located on the i-th (i is a natural number) horizontal line and the j-th (j is a natural number) vertical line of the display unit 10, and may be connected to the i-th scan line Si, the i-th emission control line Ei, and the j-th data line Dj. According to some embodiments, the pixels PXL located in the display unit 10 of FIG. 1 may have substantially the same structure. Hereinafter, the "i-th scan line Si", the "i-th emission control line Ei", and the "j-th data line Dj" are referred to as a "scan line Si", an "emission control line Ei", and a "data line Dj", respectively.

The pixel PXij includes a light emitting element LD and a pixel circuit PXC for driving the light emitting element LD. The pixel circuit PXC includes first to seventh transistors T1 to T7 and a storage capacitor Cst.

The light emitting element LD is connected between the first pixel power VDD and the second pixel power VSS in a forward direction. For example, an anode electrode of the light emitting element LD may be connected to the first pixel power VDD via the pixel circuit PXC, and a cathode electrode of the light emitting element LD may be connected to the second pixel power VSS. The first pixel power VDD and the second pixel power VSS may have a potential difference that allows the light emitting element LD to emit light. For example, the first pixel power VDD may be high potential pixel power, and the second pixel power VSS may have low potential pixel power having a potential lower than that of the first pixel power VDD by a threshold voltage or more of the light emitting element LD.

The light emitting element LD may be configured of an organic light emitting diode. In addition, the light emitting element LD may be configured of an inorganic LED such as a micro light emitting diode (LED) or a quantum dot LED. In addition, the light emitting element LD may be configured of an organic material and an inorganic material in a complex manner. In FIG. 2, the pixel PXij includes a single light emitting element LD, but according to some embodiments, the pixel PXij may include a plurality of light emitting elements LD, and the plurality of light emitting elements LD may be connected to each other in series, in parallel, or in series and parallel.

The anode electrode of the light emitting element LD is connected to the first transistor T1 via the third transistor T3, and a cathode electrode of the light emitting element LD is connected to the second pixel power VSS. When a driving current is supplied from the first transistor T1, the light emitting element LD generates light of a luminance corresponding to a current amount of the driving current.

A first electrode of the first transistor T1 is connected to the first pixel power VDD via the fourth transistor T4, and a second electrode of the first transistor T1 is connected to the anode electrode of the light emitting element LD via the third transistor T3. In addition, a gate electrode of the first transistor T1 may be connected to a control node ND. The first transistor T1 controls a driving current flowing from the first pixel power VDD to the second pixel power VSS via the light emitting element LD according to a voltage of the control node ND.

The second transistor T2 is connected between the data line Dj and the first electrode of the first transistor T1. In addition, a gate electrode of the second transistor T2 is connected to the scan line Si. The second transistor T2 is turned on when the scan signal is supplied to the scan line Si, to connect the data line Dj and the first electrode of the first transistor T1. Therefore, when the second transistor T2 is turned on, the data signal from the data line Dj may be transmitted to the first electrode of the first transistor T1. Meanwhile, during a period in which the second transistor T2 is turned on by the scan signal, the first transistor T1 is turned on in a diode-connected form by the fifth transistor T5. Accordingly, the data signal from the data line Dj may be transmitted to the control node N10 via the second transistor T2, the first transistor T1, and the fifth transistor T5. Then, the storage capacitor Cst charges a voltage corresponding to the data signal and a threshold voltage of the first transistor T1.

The third transistor T3 is connected between the first transistor T1 and the light emitting element LD, and a gate electrode of the third transistor T3 is connected to the emission control line Ei. The third transistor T3 is turned off when the emission control signal is supplied to the emission control line Ei, and is turned on in other cases.

The fourth transistor T4 is connected between the first pixel power VDD and the first transistor T1. In addition, a gate electrode of the fourth transistor T4 is connected to the emission control line Ei. The fourth transistor T4 is turned off when the emission control signal is supplied to the emission control line Ei, and is turned on in other cases.

That is, the third and fourth transistors T3 and T4 may be simultaneously turned on or turned off by the emission control signal. When the third and fourth transistors T3 and T4 are turned on, a current path through which a driving current flows is formed in the pixel PXij. Conversely, when the third and fourth transistors T3 and T4 are turned off, the current path is blocked, and thus the pixel PXij does not emit light.

The fifth transistor T5 is connected between the first transistor T1 and the control node ND. In addition, a gate electrode of the fifth transistor T5 is connected to the scan line Si. The fifth transistor T5 is turned on when the scan signal is supplied to the scan line Si, to connect the second electrode of the first transistor T1 and the control node ND. Therefore, when the fifth transistor T5 is turned on, the first transistor T1 is connected in a diode form.

The sixth transistor T6 is connected between the control node ND and initialization power Vint. In addition, a gate electrode of the sixth transistor T6 is connected to a previous scan line, for example, an (i−1)-th scan line Si−1. The sixth transistor T6 is turned on when the scan signal is supplied to the (i−1)-th scan line Si−1, to initialize the voltage of the control node ND to a voltage of the initialization power Vint.

Meanwhile, according to some embodiments, the (i−1)-th scan line Si−1 is used as an initialization control line for initializing a gate node of the first transistor T1, that is, the control node ND, but embodiments according to the present disclosure are not limited thereto. For example, according to some embodiments, another control line including an (i−2)-th scan line Si−2 may be used as the initialization control line for initializing the gate node of the first transistor T1.

The voltage of the initialization power Vint may be set to a voltage lower than a voltage of the data signal. That is, the voltage of the initialization power Vint may be set to be equal to or less than a minimum voltage of the data signal. Therefore, before transmitting the data signal of a current frame to each pixel PXij, when the voltage of the control node ND charged by the data signal of a previous frame is initialized to be equal to or less than the minimum voltage of the data signal, the first transistor T1 is diode-connected in the forward direction during a period in which the scan signal is supplied to the scan line Si regardless of the data signal of the previous frame. Accordingly, the data signal of the current frame may be stably transmitted to the control node ND.

The seventh transistor T7 is connected between the initialization power Vint and the anode electrode of the light emitting element LD. In addition, a gate electrode of the seventh transistor T7 is connected to an (i+1)-th scan line Si+1. The seventh transistor T7 is turned on when the scan signal is supplied to the (i+1)-th scan line Si+1, to initialize an anode voltage of the light emitting element LD to the voltage of the initialization power Vint. Accordingly, the pixel PXij may exhibit a uniform luminance characteristic.

Meanwhile, according to some embodiments, a case where an anode initialization control line to which the gate electrode of the seventh transistor T7 is connected is the (i+1)-th scan line (Si+1) is disclosed as an example, but embodiments according to the present disclosure are not limited thereto. For example, according to some embodiments, the gate electrode of the seventh transistor T7 may be connected to a current scan line, that is, the scan line Si (or another control line). In this case, when the scan signal is supplied to the scan line Si, the anode voltage of the light emitting element LD may be initialized to the voltage of the initialization power Vint.

The storage capacitor Cst is connected between the first pixel power VDD and the control node ND. The storage capacitor Cst charges a voltage corresponding to the data signal and a voltage corresponding to the threshold voltage of the first transistor T1.

Meanwhile, a structure of the pixel PXij is not limited to the embodiments shown in FIG. 2. For example, the pixel circuit PXC may have various structures which are currently known.

Figure 3:
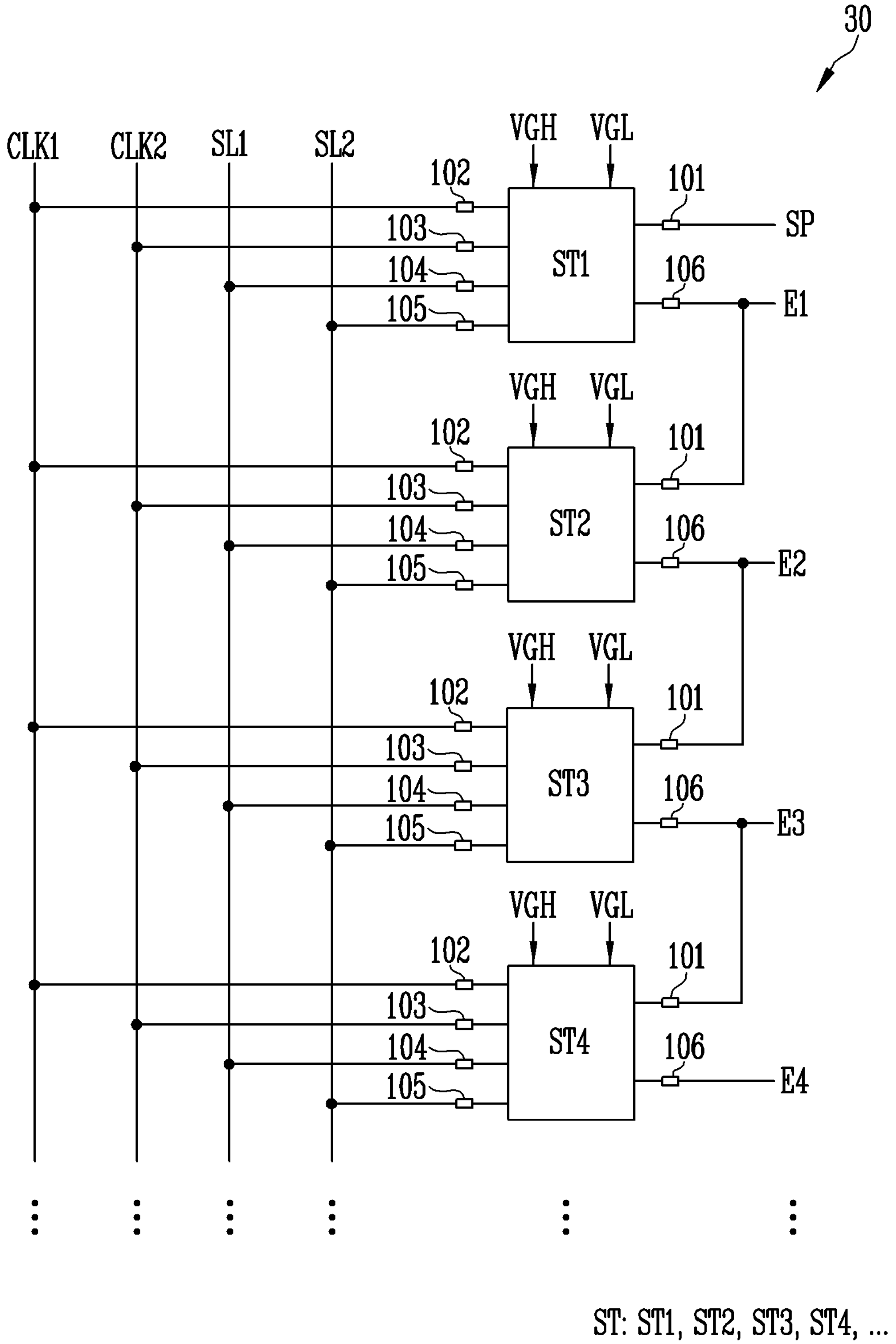
FIG. 3 illustrates an emission control driver according to some embodiments of the present disclosure.

FIG. 3 illustrates an emission control driver according to some embodiments of the present disclosure. For convenience, in FIG. 3, only four stages ST, for example, first to fourth stages ST1 to ST4 are shown. According to some embodiments, the emission control driver 30 may include a plurality of stages ST dependently connected to an input terminal (for example, a first input terminal 101 of the first stage ST1) of a start pulse SP, such as the first to fourth stages ST1 to ST4.

Referring to FIGS. 1 and 3, the emission control driver 30 according to some embodiments of the present disclosure may include the plurality of stages ST to supply respective emission control signals to the plurality of emission control lines E.

The stages ST are connected to one of emission control lines E1 to E4 and may be driven according to a first clock signal CLK1, a second clock signal CLK2, a first selection signal SL1, and a second selection signal SL2.

The first selection signal SL1 may be one of the first clock signal CLK1 or a signal having a first gate voltage VGH. The second selection signal SL2 may be one of the second clock signal CLK2 or a signal having a second gate voltage VGL.

According to some embodiments, in a low luminance mode, the first selection signal SL1 may be the first clock signal CLK1, and the second selection signal SL2 may be the second clock signal CLK2. In a high luminance mode, the first selection signal SL1 may be the signal having the first gate voltage VGH, and the second selection signal SL2 may be the signal having the second gate voltage VGL.

According to some embodiments, the timing controller 50 may select one of the high luminance mode or the low luminance mode based on luminance information of the input image data supplied from the outside. The timing controller 50 may set a display mode to the high luminance mode when a luminance of the input image data is equal to or greater than a first reference value, and may set the display mode to the low luminance mode when the luminance of the input image data is less than a second reference value. Here, the luminance of the input image data may be an average luminance of the entire image data. For example, the high luminance mode may be a mode for displaying an image with a luminance of 1000 nit or more, and the low luminance mode may be a mode for displaying an image with a luminance of less than 850 nit.

The timing controller 50 may control the first selection signal SL1 and the second selection signal SL2 applied to the stages ST according to the high luminance mode or the low luminance mode. More detailed content related to this is described together with an input terminal of the stages ST.

The first to fourth stages ST1 to ST4 may be connected to the first to fourth emission control lines E1 to E4, respectively, and may generate respective emission control signals using the first clock signal CLK1, the second clock signal CLK2, the first selection signal SL1, and the second selection signal SL2.

The first to fourth stages ST1 to ST4 may sequentially output the emission control signal to the first to fourth emission control lines E1 to E4. According to some embodiments, the stages ST may have substantially the same circuit structure.

Each of the stages ST may include the first input terminal 101, a second input terminal 102, a third input terminal 103, a fourth input terminal 104, a fifth input terminal 105, and an output terminal 106.

The first input terminal 101 may receive a first input signal. According to some embodiments, the first input signal may be the start pulse SP or an output signal of a previous stage (that is, an emission control signal of the previous stage). For example, the first stage (hereinafter referred to as the "first stage ST1") may receive the start pulse SP through the first input terminal 101, and the remaining stages ST may receive the output signal of the previous stage through the respective input terminals 101.

The second input terminal 102 and the third input terminal 103 may receive a second input signal and a third input signal, respectively. According to some embodiments, the second input signal may be the first clock signal CLK1, and the third input signal may be the second clock signal CLK2.

The first clock signal CLK1 and the second clock signal CLK2 may alternately have the second gate voltage. For example, the first clock signal CLK1 and the second clock signal CLK2 may be signals having the same period and phases which are not overlapping each other. For example, the second clock signal CLK2 may be a clock signal of a form in which the first clock signal CLK1 is shifted by half a period.

Additionally, the stages ST may operate by receiving the first gate voltage VGH and the second gate voltage VGL. The first gate voltage VGH may be set to a gate-off voltage, for example, a logic high level, and the second gate voltage VGL may be set to a gate-on voltage, for example, a logic low level (when the pixels are formed of a P-type transistor). In this case, the first gate voltage VGH transmitted to the output terminal 106 may be used as the emission control signal preventing or reducing emission of the pixels PXL.

Figure 4:
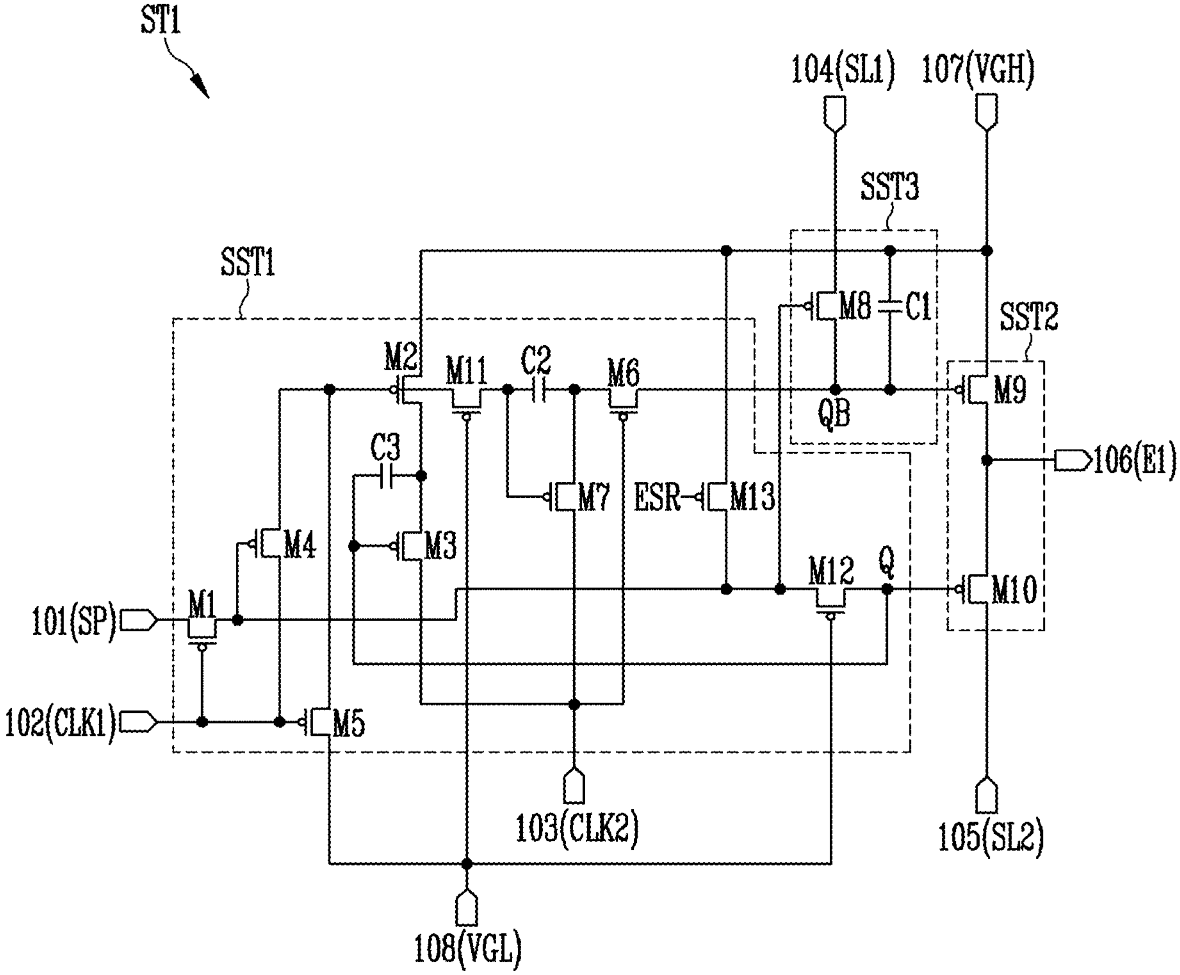
FIG. 4 illustrates further details of a stage shown in FIG. 3.

FIG. 4 illustrates further details of the stage shown in FIG. 3. Although FIG. 4 illustrates various components in a stage according to some embodiments, embodiments according to the present disclosure are not limited thereto, and according to various embodiments the stage may include additional components or fewer components without departing from the spirit and scope of embodiments according to the present disclosure.

According to some embodiments, the plurality of stages ST configuring the emission control driver 30 may have substantially the same circuit structure. Therefore, in FIG. 4, only the first stage ST1 is shown on behalf of the stages ST.

Referring to FIGS. 3 and 4, according to some embodiments of the present disclosure, the stage ST may include a node control unit (or node controller) SST1, an output unit SST2 (or a buffer unit), and a node maintenance unit SST3.

The stage ST may generate the emission control signal using the first to fifth input signals supplied through the first to fifth input terminals 101 to 105, respectively, and supply the generated emission control signal to the output terminal 106. For example, the stage ST may output each emission control signal using a start pulse or a previous stage output signal, the first and second clock signals CLK1 and CLK2, and the first and second selection signals SL1 and SL2 supplied through the first to fifth input terminals 101 to 105, respectively.

In addition, the stage ST may receive the first and second gate voltages VGH and VGL through first and second power terminals 107 and 108, respectively. The stage ST may control a voltage of the output terminal 106 using voltages of the first and second gate voltages VGH and VGL supplied to the first and second power terminals 107 and 108. For convenience, a circuit structure of each stage ST is described below based on the first stage ST1.

First, the output unit SST2 may be connected to the first power terminal 107 and the fifth input terminal 105, and the output unit SST2 may output the first gate voltage VGH to the output terminal 106 as the emission control signal based on a voltage of a second control node Q and a voltage of a first control node QB.

The output unit SST2 may include a ninth transistor M9 (or a pull-up transistor) and a tenth transistor M10 (or a pull-down transistor).

The ninth transistor M9 may include a first electrode connected to the first power terminal 107, a second electrode connected to the output terminal 106, and a gate electrode connected to the first control node QB.

The tenth transistor M10 may include a first electrode connected to the output terminal 106, a second electrode connected to the fifth input terminal 105, and a gate electrode connected to the second control node Q.

The node control unit SST1 may be connected to the first input terminal 101, the second input terminal 102, the third input terminal 103, the first power terminal 107, and the second power terminal 108. The node control unit SST1 may control the voltage of the first control node QB and the voltage of the second control node Q using the start pulse SP (or the emission control signal of the previous stage) provided through the first input terminal 101.

The node control unit SST1 may include first, second, third, fourth, fifth, sixth, seventh, eleventh, twelfth, and thirteenth transistors M1, M2, M3, M4, M5, M6, M7, M11, M12, and M13, a second capacitor C2 (or a first coupling capacitor), and a third capacitor C3 (or a second coupling capacitor).

The first transistor M1 may include a first electrode connected to the first input terminal 101, a second electrode connected to a first electrode of the twelfth transistor M12, and a gate connected to the second input terminal 102.

The second transistor M2 may include a first electrode connected to the first power terminal 107, a second electrode connected to a first electrode of the third transistor M3, and a gate electrode connected to a first electrode of the fourth transistor M4.

The third transistor M3 may include the first electrode connected to the second electrode of the second transistor M2, a second electrode connected to the third input terminal 103, and a gate connected to the second control node Q.

The third capacitor C3 may be formed between the second electrode of the second transistor M2 and the second control node Q, and may include a first electrode connected to the second electrode of the second transistor M2 and a second electrode connected to the second control node Q. According to some embodiments, the second electrode of the third capacitor C3 may be connected to the gate electrode of the third transistor M3.

The fourth transistor M4 may include a first electrode connected to the gate electrode of the second transistor M2, a second electrode connected to the second input terminal 102, and a gate electrode connected to the second electrode of the first transistor M1.

The fifth transistor M5 may include a first electrode connected to the gate electrode of the second transistor M2, a second electrode connected to the second power terminal 108, and a gate electrode connected to the second input terminal 102.

The sixth transistor M6 may include a first electrode connected to the first control node QB, a second electrode connected to a first electrode of the seventh transistor M7, and a gate electrode connected to the third input terminal 103.

The seventh transistor M7 may include a first electrode connected to the second electrode of the sixth transistor M6, a second electrode connected to the third input terminal 103, and a gate electrode connected to a second electrode of the eleventh transistor M11.

The second capacitor C2 (or the first coupling capacitor) may be formed between the second electrode of the eleventh transistor M11 and the second electrode of the sixth transistor M6, and may include a first electrode connected to the second electrode of the eleventh transistor M11 and a second electrode connected to the second electrode of the sixth transistor M6.

The eleventh transistor M11 (or a first coupling transistor) may include the first electrode connected to the gate electrode of the second transistor M2, the second electrode connected to the first electrode of the second capacitor C2, and a gate electrode connected to the second power terminal 108.

The twelfth transistor M12 (or a second coupling transistor) may include the first electrode connected to the second electrode of the first transistor M1, a second electrode connected to the second control node Q, and a gate electrode connected to the second power terminal 108.

The thirteenth transistor M13 (or a short-circuit protection transistor) may include a first electrode connected to the second electrode of the second transistor M2, a second electrode connected to the second electrode of the first transistor M1, and a gate electrode connected to a control signal ESR. When the display device 1 is powered on after forcible reset, the control signal ESR having a logic low level may be applied, and thus the thirteenth transistor M13 may be turned on. Accordingly, a voltage at the second electrode (the second control node Q) of the first transistor T1 immediately may have the first gate voltage VGH, and thus a turn-off operation of the tenth transistor M10 may be quickly performed.

The node maintenance unit SST3 may maintain the voltage of the first control node QB constant in response to the voltage of the second control node Q. The node maintenance unit SST3 may include a first capacitor C1 and an eighth transistor T8.

The first capacitor C1 may be formed at the first power terminal 107 and the first control node QB, and may include a first electrode connected to the first power terminal 107 and a second electrode connected to the first control node QB.

The eighth transistor M8 may include a first electrode connected to the fourth input terminal 104, a second electrode connected to the first control node QB, and a gate connected to the second electrode of the first transistor M1.

Each of the first to thirteenth transistors M1 to M13 may be a P-type transistor. In addition, according to some embodiments, for reliability improvement, at least one of the first to thirteenth transistors M1 to M13 may be implemented as a dual gate transistor.

Figure 5:
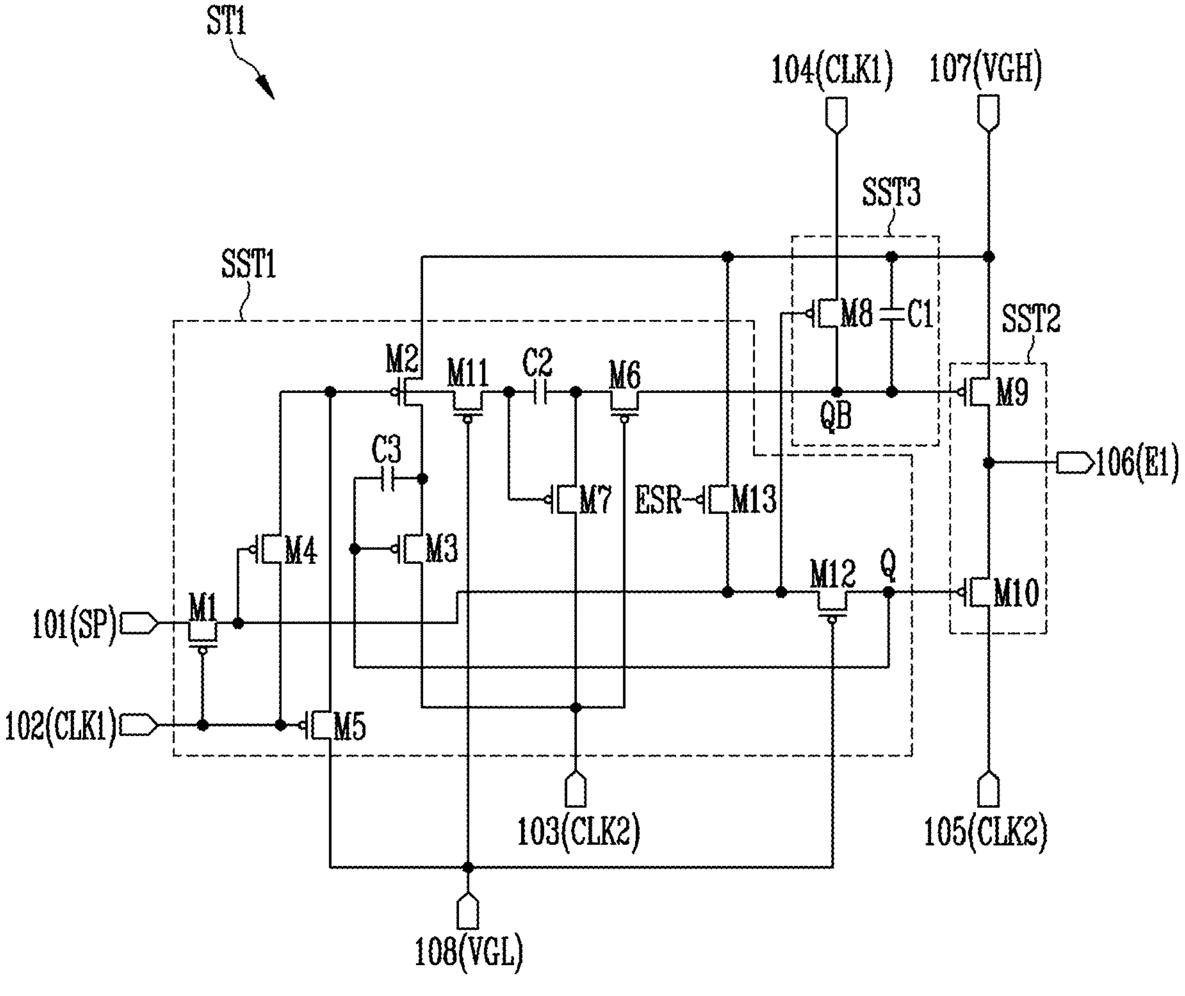
FIG. 5 illustrates further details of a first stage in a low luminance mode.

FIG. 5 illustrates further details of the first stage in the low luminance mode. Referring to FIGS. 4 and 5, in the low luminance mode, the first selection signal SL1 may have the first clock signal CLK1, and the second selection signal SL2 may have the second clock signal CLK2.

According to some embodiments, in the low luminance mode, the timing controller 50 may apply the first clock signal CLK1 to the fourth input terminal 104 and apply the second clock signal CLK2 to the fifth input terminal 105.

That is, in the low luminance mode, the timing controller 50 may apply the first clock signal CLK1 to the second input terminal 102 and the fourth input terminal 104 and apply the second clock signal CLK2 to the third input terminal 103 and the fifth input terminal 105.

In FIG. 5, embodiments in which the timing controller 50 changes the signal applied to the fourth and fifth input terminals 104 and 105 is described, but embodiments according to the present disclosure are not limited thereto, and the stages ST may include a separate switching circuit, and the signal applied to the fourth and fifth input terminals 104 and 105 may be changed by the switching circuit.

In addition, in the low luminance mode, the second input terminal 102 and the fourth input terminal 104 may not be distinguished as separate input terminals, and may be implemented as one input terminal. The third input terminal 103 and the fifth input terminal 105 may not be distinguished as separate input terminals, and may be implemented as one input terminal.

Figure 6:
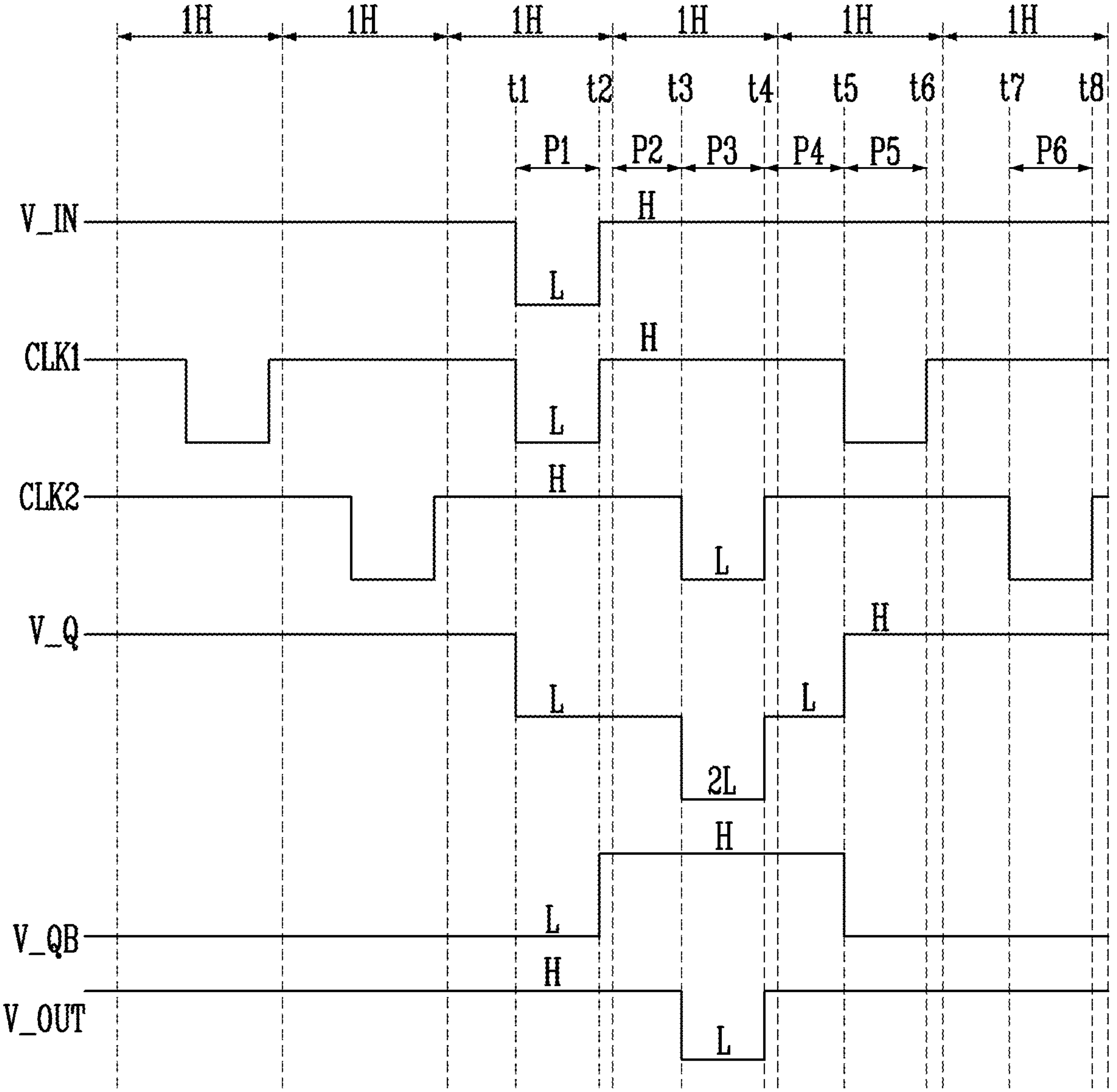
FIG. 6 is a waveform diagram illustrating an example of signals measured in the first stage of FIG. 5.

FIG. 6 is a waveform diagram illustrating an example of signals measured in the first stage of FIG. 5.

Referring to FIGS. 5 and 6, signals measured in the first stage in the low luminance mode are shown. The first clock signal CLK1 applied to the second input terminal 102 may have a logic low level and a logic high level in a cycle of 2 horizontal times 2H. Here, the logic low level may be the same as a voltage level of the second gate voltage VGL that turns on a P-type transistor. The logic high level may be the same as a level of the first gate voltage VGH that turns off the P-type transistor.

The second clock signal CLK2 applied to the third input terminal 103 may have a waveform in which the first clock signal CLK1 is delayed by half a cycle (that is, 1 horizontal time 1H).

At a first time point t1, an input voltage V_IN (for example, the start pulse SP) at the first input terminal 101 and the first clock signal CLK1 may change from the logic high level to the logic low level.

During a first period P1 between the first time point t1 and a second time point t2, the input voltage V_IN and the first clock signal CLK1 may have the logic low level, and the second clock signal CLK2 may have the logic high level.

In addition, in the first period P1, a second node voltage V_Q at the second control node Q may have the logic low level, a first node voltage V_QB at the first control node QB may have the logic low level, and an output voltage V_OUT (that is, the emission control signal) at the output terminal 106 may have the logic high level. The first period P1 may be shorter than 1 horizontal period 1H. That is, a width of the start pulse SP may be shorter than 1 horizontal period 1H in the low luminance mode.

According to some embodiments, according to a color of an emitting pixel, the width of the start pulse SP may be changed within a range shorter than 1 horizontal period 1H. For example, the width of the start pulse SP applied to a red R pixel may be shorter than the width of the start pulse SP applied to a blue B pixel.

At the second time point t2, the input voltage V_IN and the first clock signal CLK1 may change from the logic low level to the logic high level. The second clock signal CLK2 may maintain the logic high level.

During a second period P2 between the second time point t2 and a third time point t3, the input voltage V_IN, the first clock signal CLK1, and the second clock signal CLK2 may have the logic high level.

In addition, during the second period P2, the second node voltage V_Q at the second control node Q may have the logic low level, the first node voltage V_QB at the first control node QB may have the logic high level, and the output voltage V_OUT at the output terminal 106 may have the logic high level.

At the third time point t3, the second clock signal CLK2 may change from the logic high level to the logic low level. The input voltage V_IN and the first clock signal CLK1 may maintain the logic high level.

During a third period P3 between the third time point t3 and a fourth time point t4, the input voltage V_IN and the first clock signal CLK1 may have the logic high level, and the second clock signal CLK2 may have the logic low level.

In addition, during the third period P3, the second node voltage V_Q at the second control node Q may have the second logic low level, the first node voltage V_QB at the first control node QB may have the logic high level, and the output voltage V_OUT at the output terminal 106 may have the logic low level. The third period P3 may be shorter than 1 horizontal period 1H.

That is, in the low luminance mode, a duty of the emission control signal may be controlled so that the output voltage V_OUT has the logic low level during a period shorter than 1 horizontal period 1H. Accordingly, the display device 1 may accurately express a low luminance.

In addition, because light emission efficiency of the pixel may be relatively improved through light emission duty adjustment, power consumption of the display device 1 may be relatively reduced.

At the fourth time point t4, the second clock signal CLK2 may change from the logic low level to the logic high level. The input voltage V_IN and the first clock signal CLK1 may maintain the logic high level.

During a fourth period P4 between the fourth time point t4 and a fifth time point t5, the input voltage V_IN, the first clock signal CLK1, and the second clock signal CLK2 may have the logic high level.

In addition, during the fourth period P4, the second node voltage V_Q at the second control node Q may have the logic low level, the first node voltage V_QB at the first control node QB may have the logic high level, and the output voltage V_OUT at the output terminal 106 may have the logic high level.

At the fifth time point t5, the first clock signal CLK1 may change from the logic high level to the logic low level. The input voltage V_IN and the second clock signal CLK2 may maintain the logic high level.

During a fifth period P5 between the fifth time point t5 and a sixth time point t6, the input voltage V_IN and the second clock signal CLK2 may have the logic high level, and the first clock signal CLK1 may have the logic low level.

In addition, during the fifth period P5, the second node voltage V_Q at the second control node Q may have the logic high level, the first node voltage V_QB at the first control node QB may have the logic low level, and the output voltage V_OUT at the output terminal 106 may have the logic high level.

At the sixth time point t6, the first clock signal CLK1 may change from the logic low level to the logic high level. The input voltage V_IN and the first clock signal CLK1 may maintain the logic high level.

At a seventh time point t7, the second clock signal CLK2 may change from the logic high level to the logic low level. The input voltage V_IN and the first clock signal CLK1 may maintain the logic high level.

During a sixth period P6 between the seventh time point t7 and an eighth time point t8, the input voltage V_IN and the first clock signal CLK1 may have the logic high level, and the second clock signal CLK2 may have the logic low level.

In addition, during the sixth period P6, the second node voltage V_Q at the second control node Q may have the logic high level, the first node voltage V_QB at the first control node QB may have the logic low level, and the output voltage V_OUT at the output terminal 106 may have the logic high level.

FIGS. 7 to 12 are circuit diagrams illustrating an operation process of the first stage according to the signals of FIG. 6.

Figure 7:
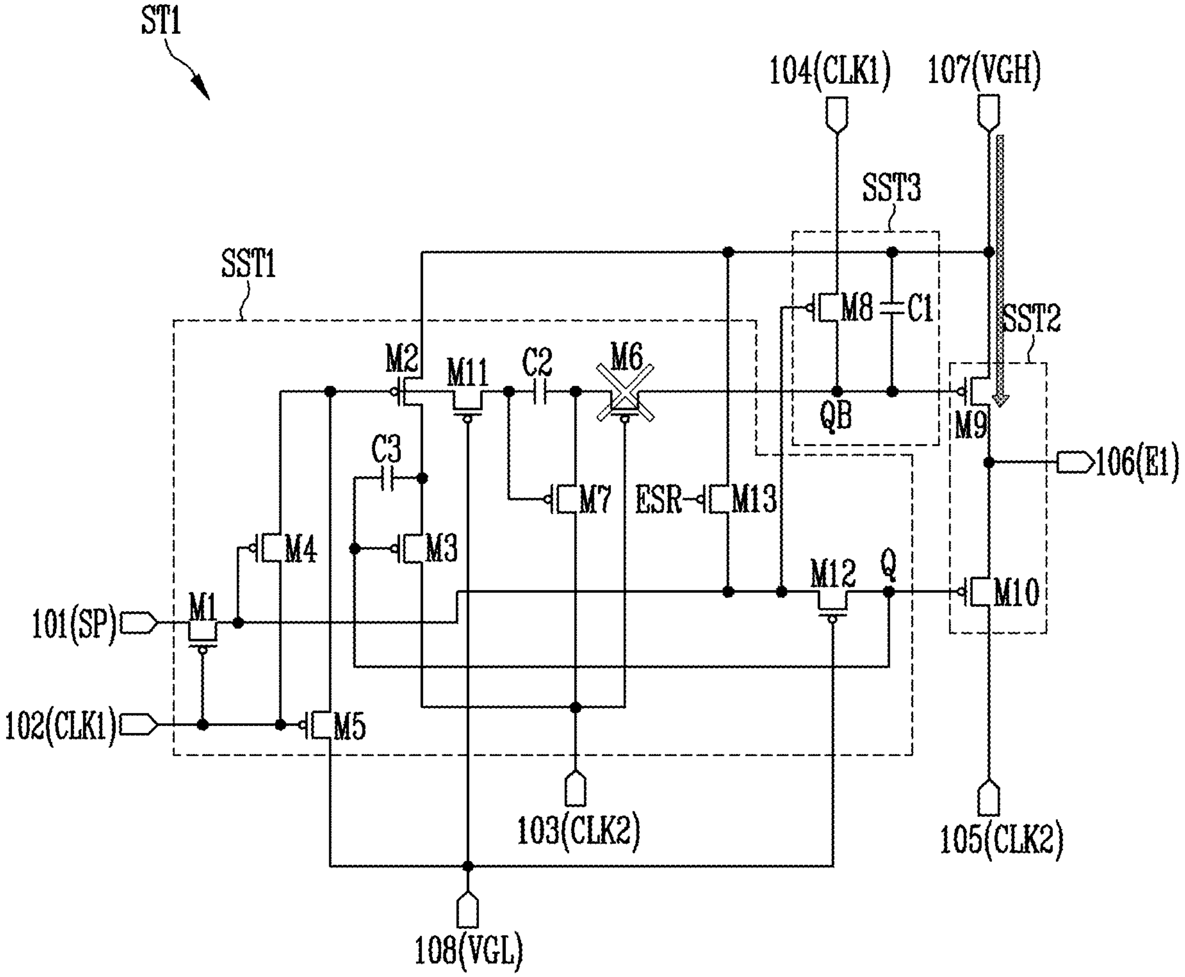
FIGS. 7 to 12 are circuit diagrams illustrating an operation process of the first stage according to the signals of FIG. 6.

Referring to FIG. 7, during the first period P1, the input voltage V_IN and the first clock signal CLK1 may have the logic low level, and the second clock signal CLK2 may have the logic high level.

In this case, the first transistor M1 may be turned on in response to the first clock signal CLK1 of the logic low level, and the input voltage V_IN of the logic low level may be applied to the first electrode of the twelfth transistor M12. Because the twelfth transistor M12 is in a turn-on state by the second gate voltage VGL, the input voltage V_IN of the logic low level may be applied to the second control node Q through the twelfth transistor M12.

Meanwhile, the fourth transistor M4 may be turned on by the input voltage V_IN of the logic low level provided through the first transistor M1, the fifth transistor M5 may be turned on in response to the first clock signal CLK1 of the logic low level, and the second gate voltage VGL (and the first clock signal CLK1) may be applied to the gate electrode of the second transistor M2.

The second transistor M2 may be turned on in response to the second gate voltage VGL, and the first gate voltage VGH may be applied to the first electrode of the third capacitor C3. Because the second electrode of the third capacitor C3 is connected to the second control node Q, the second node voltage V_Q of the logic low level may be applied to the second electrode of the third capacitor C3.

Meanwhile, the eighth transistor M8 may be turned on by the input voltage V_IN of the logic low level, and the first clock signal CLK1 of the logic low level may be applied to the first control node QB. That is, the first node voltage V_QB may change to have the logic low level. The ninth transistor M9 may be turned on in response to the first node voltage V_QB of the logic low level, and the first gate voltage VGH may be applied to the output terminal 106. That is, the output voltage V_OUT may have the logic high level.

In addition, the sixth transistor M6 may be turned off by the second clock signal CLK2 of the logic high level.

Figure 8:
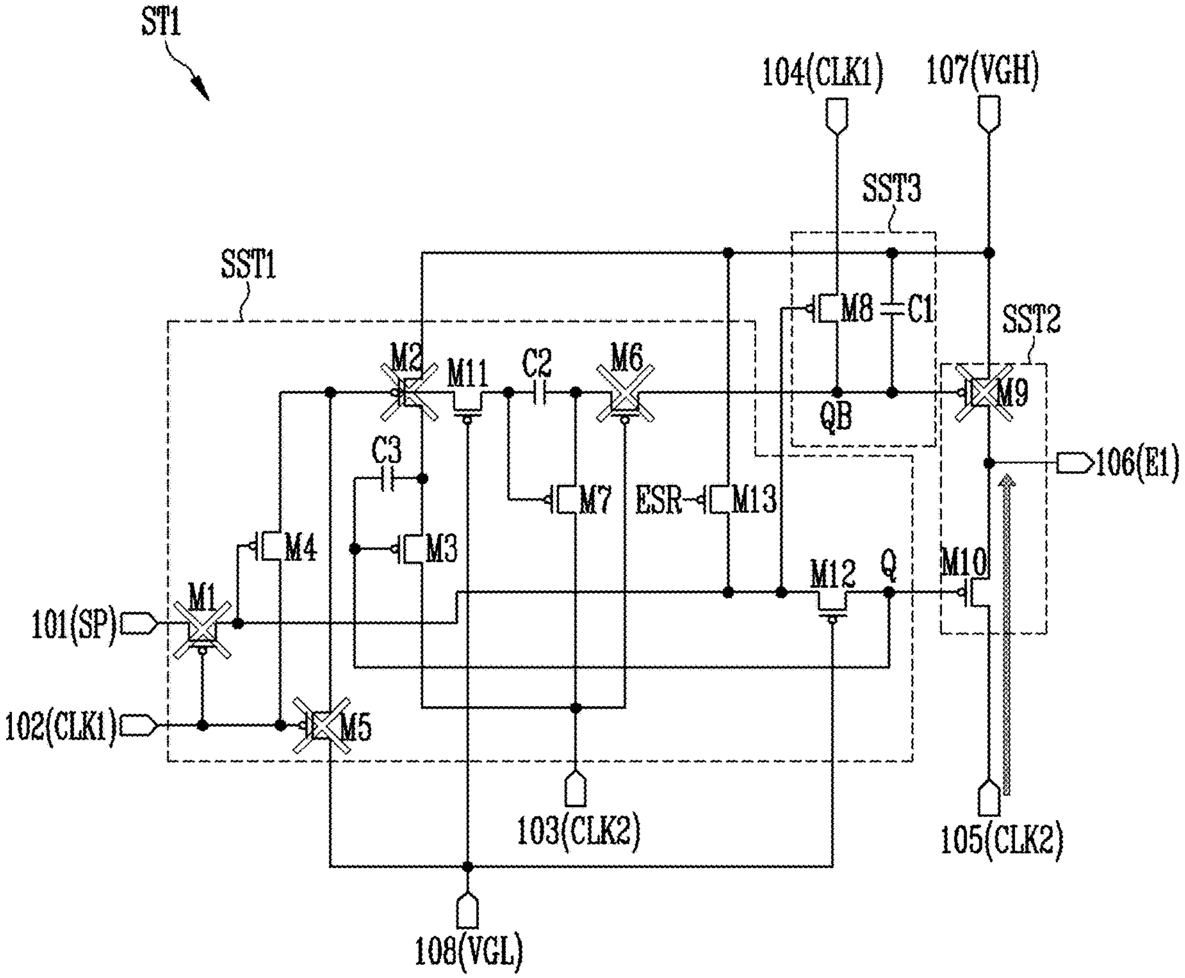

Referring to FIG. 8, during the second period P2, the input voltage V_IN, the first clock signal CLK1, and the second clock signal CLK2 may have the logic high level.

In this case, the first transistor M1 and the fifth transistor M5 may be turned off in response to the first clock signal CLK1 of the logic high level, and the sixth transistor M6 may be turned off in response to the second clock signal CLK2 of the logic high level. In addition, because the fourth transistor M4 is in a turn-on state by the second node voltage V_Q of the logic low level, the first clock signal CLK1 of the logic high level may be applied to the gate electrode of the second transistor M2. Accordingly, the second transistor M2 may be turned off.

Because the twelfth transistor M12 is in a turn-on state by the second gate voltage VGL, the second node voltage V_Q of the logic low level may be applied to the gate electrode of the eighth transistor M8 through the twelfth transistor M12. Accordingly, the eighth transistor M8 may be turned on.

In addition, because the tenth transistor M10 is turned on by the second node voltage V_Q of the logic low level, the second clock signal CLK2 of the logic high level may be applied to the output terminal 106. That is, the output voltage V_OUT may have the logic high level.

The first clock signal CLK1 of the logic high level may be applied to the first control node QB through the turned-on eighth transistor M8. The ninth transistor M9 may be turned off by the first node voltage V_QB of the logic high level.

Figure 9:
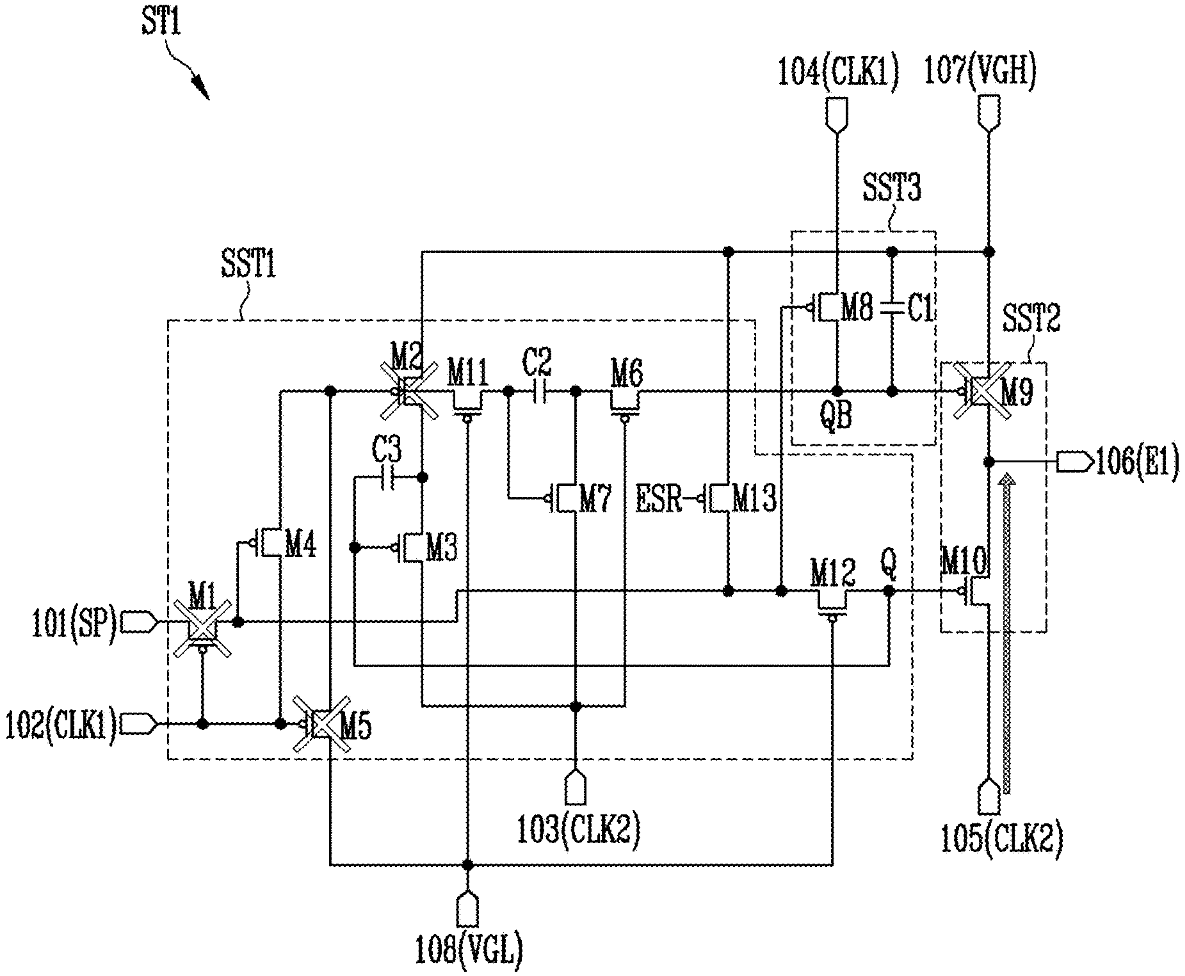

Referring to FIG. 9, during the third period P3, the input voltage V_IN and the first clock signal CLK1 may have the logic high level, and the second clock signal CLK2 may have the logic low level.

Because the third transistor M3 is in a turn-on state by the second node voltage V_Q of the logic low level, the second clock signal CLK2 of the logic low level may be applied to the first electrode of the third capacitor C3. The second node voltage V_Q may be boosted by the third capacitor C3, and the second node voltage V_Q may change to have the second logic low level. In addition, the second clock signal CLK2 of the logic low level may be applied to the output terminal 106 according to the second node voltage V_Q of the second logic low level. That is, the output voltage V_OUT may have the logic low level.

Here, the second logic low level may have a voltage level lower than the logic low level, and for example, the second logic low level may have a voltage level lower than the logic low level by the second gate voltage VGL (that is, 2VGL).

In addition, the first clock signal CLK1 of the logic high level may be applied to the first control node QB through the turned-on eighth transistor M8. The ninth transistor M9 may be turned off by the first node voltage V_QB of the logic high level.

Figure 10:
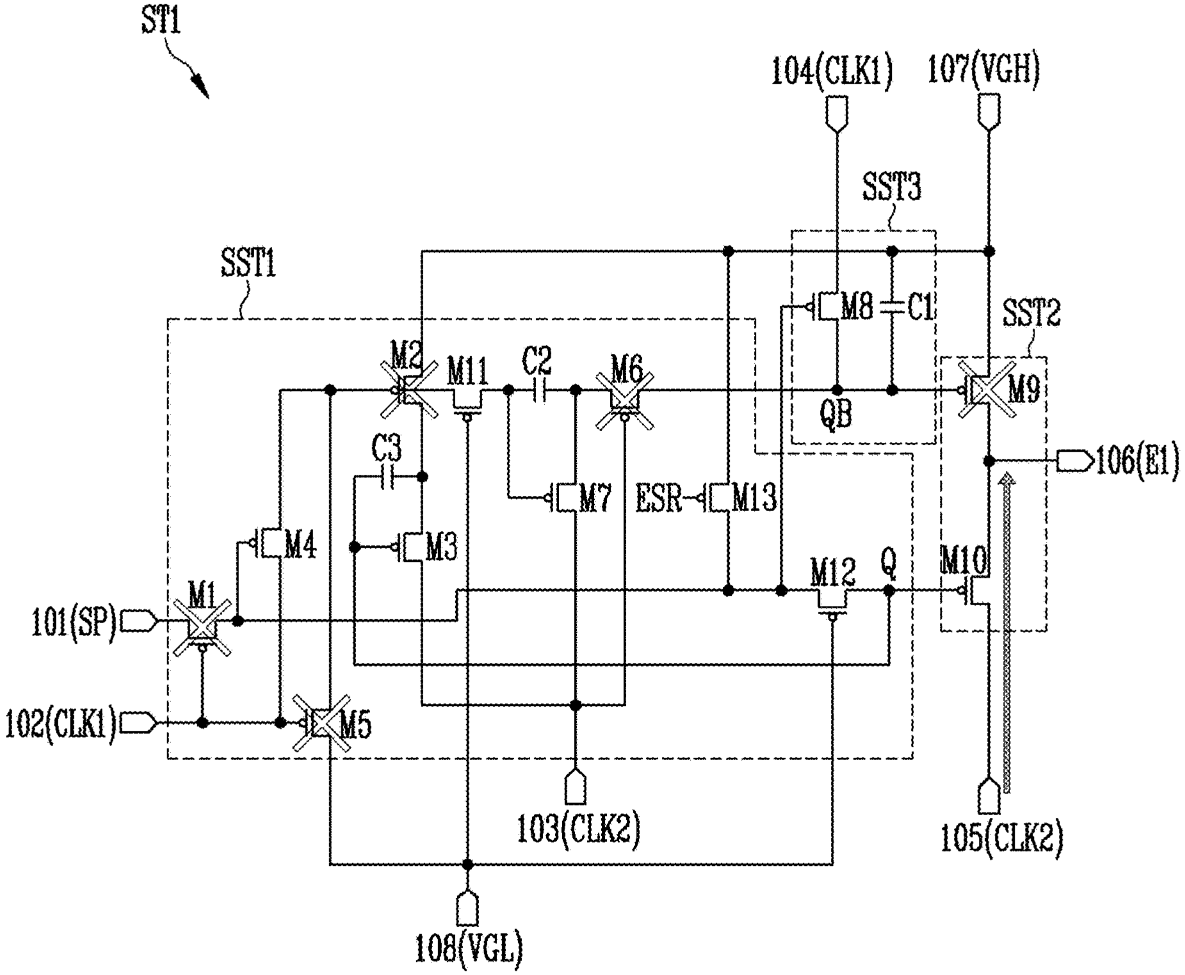

Referring to FIG. 10, during the fourth period P4, the input voltage V_IN, the first clock signal CLK1, and the second clock signal CLK2 may have the logic high level.

The second clock signal CLK2 of the logic high level may be applied to the output terminal 106 according to the second node voltage V_Q of the logic low level. That is, the output voltage V_OUT may have the logic high level.

Figure 11:
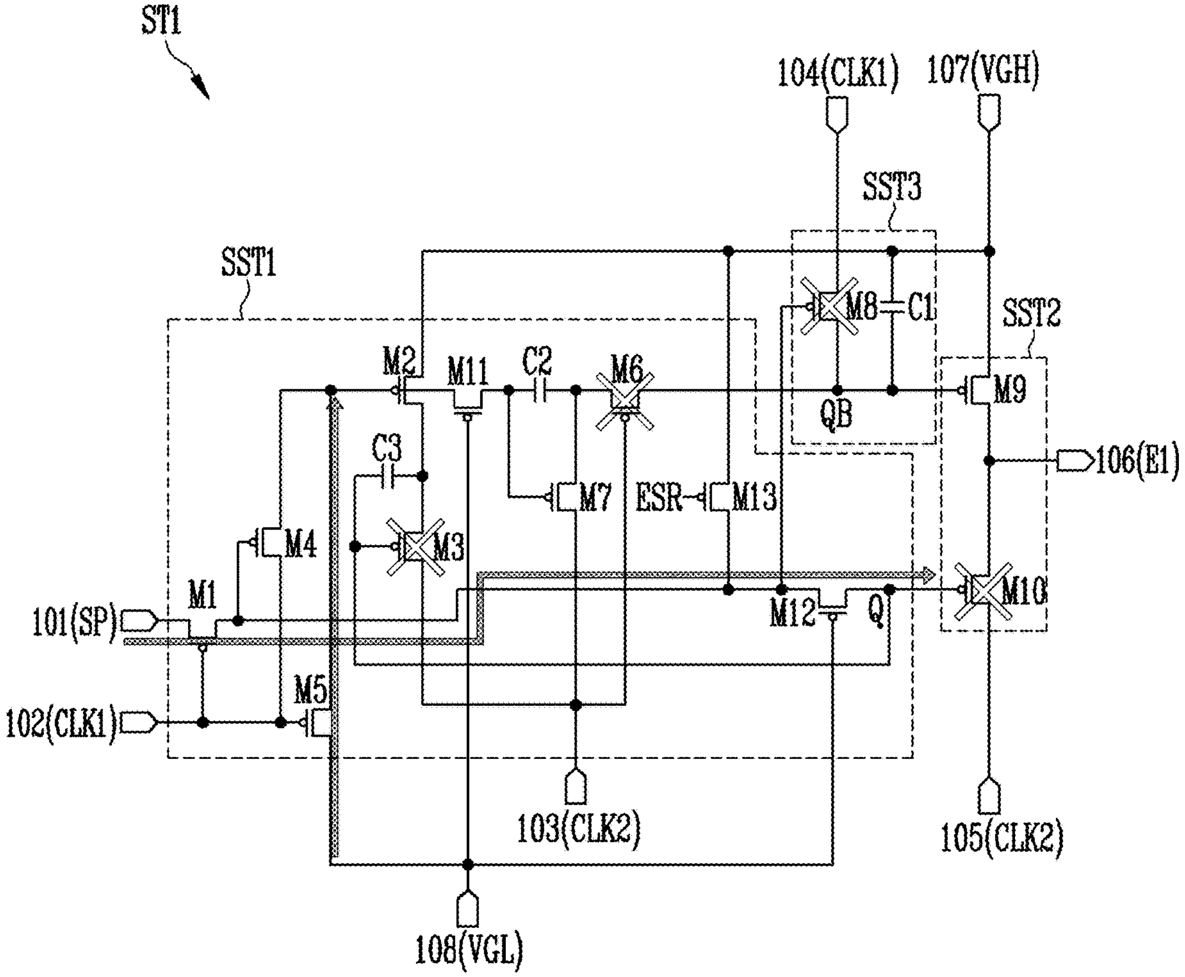

Referring to FIG. 11, during the fifth period P5, the input voltage V_IN and the second clock signal CLK2 may have the logic high level, and the first clock signal CLK1 may have the logic low level.

The first transistor M1 may be turned on in response to the first clock signal CLK1 of the logic low level, and the input voltage V_IN of the logic high level may be applied to the first electrode of the twelfth transistor M12. Because the twelfth transistor M12 is in a turn-on state by the second gate voltage VGL, the input voltage V_IN of the logic high level may be applied to the second control node Q through the twelfth transistor M12. That is, the second node voltage V_Q may have the logic high level. Accordingly, the tenth transistor M10 may be turned off.

In addition, the eighth transistor M8 may be turned off by the input voltage V_IN of the logic high level, and the first control node QB may be in a floating state. At this time, the first node voltage V_QB may be maintained as the logic low level by the first capacitor C1, and the output voltage V_OUT may be maintained as the logic high level.

Figure 12:
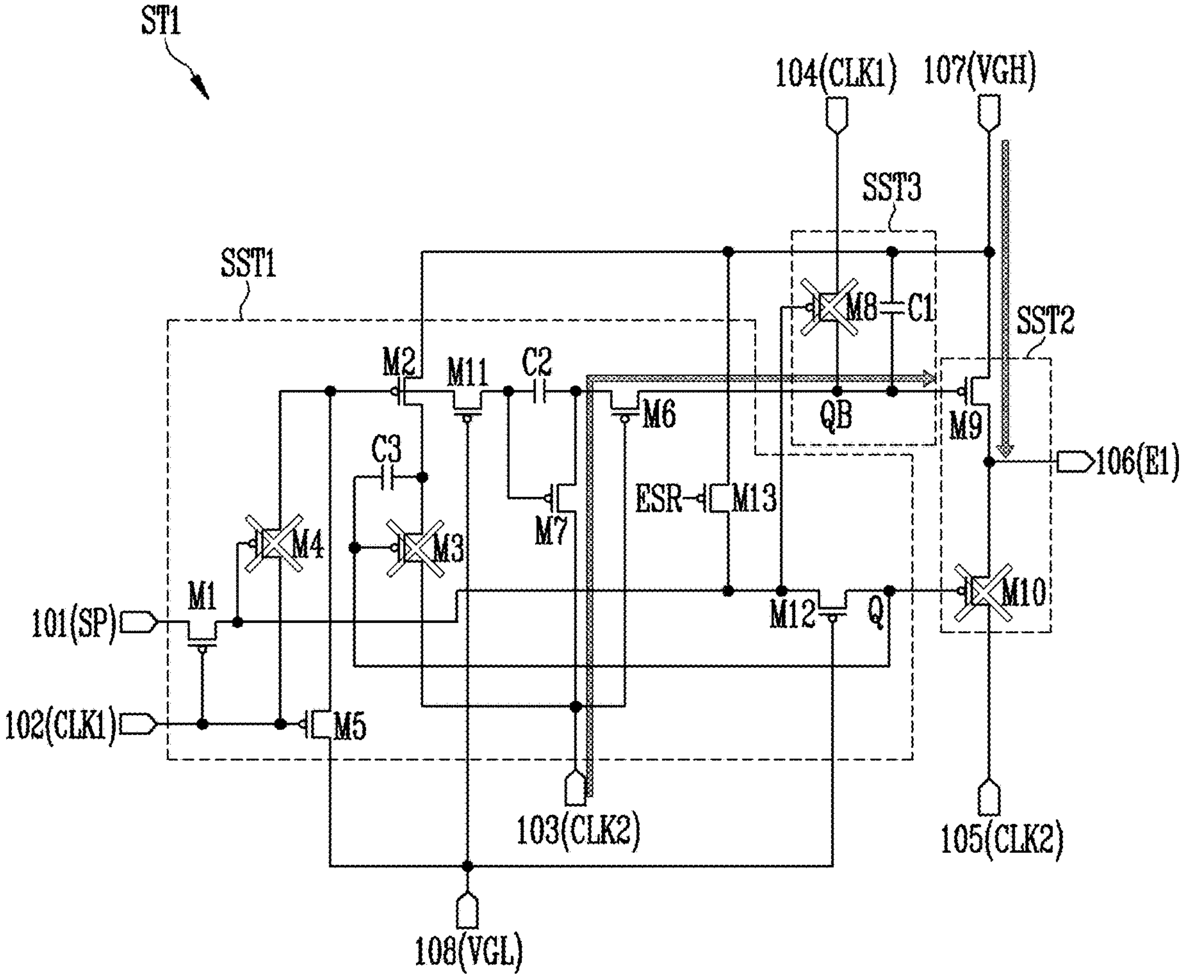

Referring to FIG. 12, during the sixth period P6, the input voltage V_IN and the first clock signal CLK1 may have the logic high level, and the second clock signal CLK2 may have the logic low level.

The sixth transistor M6 may be turned on in response to the second clock signal CLK2 of the logic low level, and the second clock signal CLK2 of the logic low level may be applied to the first control node QB through the seventh transistor M7 that is in a turn-on state by the second capacitor C2 and the turned on sixth transistor M6. That is, the first node voltage V_QB may have the logic low level.

The ninth transistor M9 may be turned on in response to the first node voltage V_QB of the logic low level, and the first gate voltage VGH may be applied to the output terminal 106 through the first power terminal 107 and the ninth transistor M9. That is, the output voltage V_OUT may change to have the logic high level.

In addition, the first transistor M1 and the fifth transistor M5 may be turned on in response to the first clock signal CLK1 of the logic low level, and the twelfth transistor M12 may be turned on in response to the second gate voltage VGL. Accordingly, the input voltage V_IN of the logic high level may be applied to the second control node Q. That is, the second node voltage V_Q may have the logic high level. Accordingly, the tenth transistor M10 may be turned off.

Figure 13:
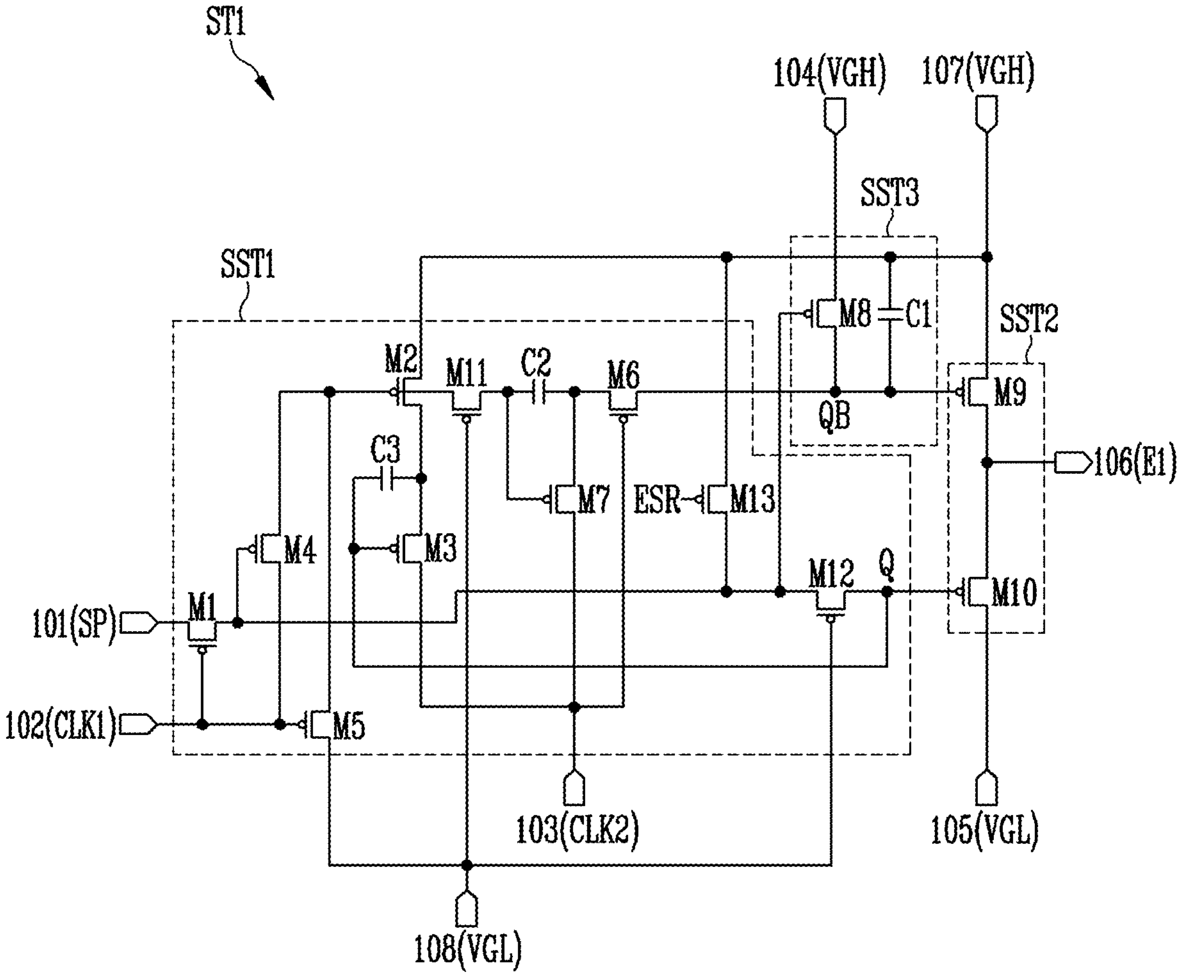
FIG. 13 illustrates an example of the first stage in a high luminance mode.

FIG. 13 illustrates further details of the first stage in the high luminance mode.

Referring to FIGS. 4 and 13, in the high luminance mode, the first selection signal SL1 may have the first gate voltage VGH, and the second selection signal SL2 may have the second gate voltage VGL.

According to some embodiments, in the high luminance mode, the timing controller 50 may apply the first gate voltage VGH to the fourth input terminal 104 and apply the second gate voltage VGL to the fifth input terminal 105.

That is, in the high luminance mode, the timing controller 50 may apply the first gate voltage VGH to the fourth input terminal 104 and the first power terminal 107, and apply the second gate voltage VGL to the fifth input terminal 105 and the second power terminal 108.

In FIG. 13, embodiments in which the timing controller 50 changes the signal applied to the fourth and fifth input terminals 104 and 105 is described, but embodiments according to the present disclosure are not limited thereto, and the stages ST may include a separate switching circuit, and the signal applied to the fourth and fifth input terminals 104 and 105 may be changed by the switching circuit.

In addition, in the high luminance mode, the fourth input terminal 104 and the first power terminal 107 may not be distinguished as separate terminals, and may be implemented as one terminal. The fifth input terminal 105 and the second power terminal 108 may not be distinguished as separate input terminals, and may be implemented as one input terminal.

Figure 14:
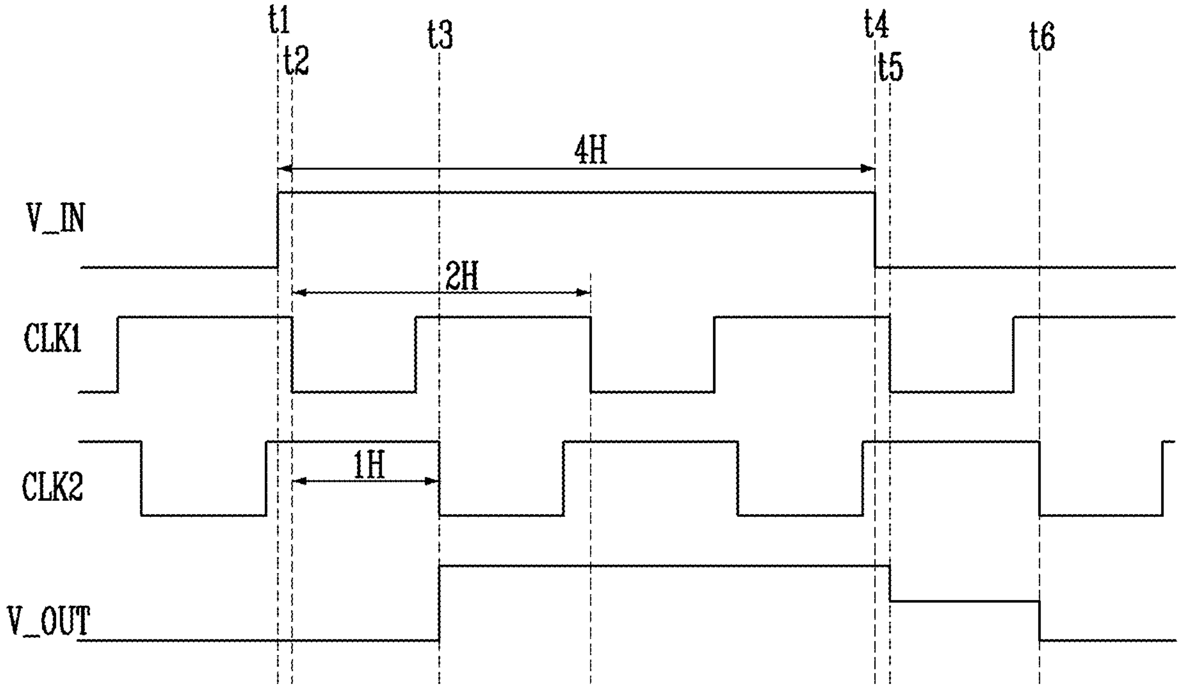
FIG. 14 is a waveform diagram illustrating an example of signals measured in the first stage of FIG. 13.

FIG. 14 is a waveform diagram illustrating an example of signals measured in the first stage of FIG. 13.

Referring to FIGS. 13 and 14, signals measured in the first stage in the high luminance mode are shown. The first clock signal CLK1 applied to the second input terminal 102 may have the logic low level and the logic high level in a cycle of 2 horizontal times 2H. Here, the logic low level may be the same as the voltage level of the second gate voltage VGL that turns on the P-type transistor. The logic high level may be the same as the level of the first gate voltage VGH that turns off the P-type transistor.

The second clock signal CLK2 applied to the third input terminal 103 may have a waveform in which the first clock signal CLK1 is delayed by half a cycle (that is, 1 horizontal time 1H).

At a first time point t1, the input voltage V_IN (for example, the start pulse SP) at the first input terminal 101 may be changed from the logic low level to the logic high level. For example, the input voltage V_IN may be maintained as the logic high level during 4 horizontal times 4H.

At the first time point t1, the second node voltage V_Q at the second control node Q may have the logic low level, the second node voltage V_Q at the first control node QB may have the logic high level, and the output voltage V_OUT (that is, the emission control signal) at the output terminal 106 may have the logic low level.

At a second time point t2, the first clock signal CLK1 may be changed from the logic high level to the logic low level.

The first transistor M1 may be turned on in response to the first clock signal CLK1 of the logic low level, and the input voltage V_IN of the logic high level may be applied to the first electrode of the twelfth transistor M12. Because the twelfth transistor M12 is in a turn-on state by the second gate voltage VGL, the input voltage V_IN of the logic high level may be applied to the second control node Q through the twelfth transistor M12. That is, the second node voltage V_Q may change to have the logic high level.

In addition, the fifth transistor M5 may be turned on in response to the first clock signal CLK1 of the logic low level, and the second gate voltage VGL may be applied to the first electrode of the eleventh transistor M11. Because the eleventh transistor M11 is in a turn-on state by the second gate voltage VGL, the second gate voltage VGL may be applied to the first electrode of the second capacitor C2. The seventh transistor M7 may be turned on in response to the second gate voltage VGL (that is, the second gate voltage VGL applied to the first electrode of the second capacitor C2), and the second clock signal CLK2 of the logic high level may be applied to the second electrode of the second capacitor C2. Therefore, a voltage corresponding to a difference between the logic high level and the logic low level may be charged in the second capacitor C2.

The second transistor M2 may be turned on in response to the second gate voltage VGL, and the first gate voltage VGH may be applied to the first electrode of the third capacitor C3. Because the second electrode of the third capacitor C3 is connected to the second control node Q, and the second node voltage V_Q has the logic high level, the third capacitor C3 may be discharged.

At a third time point t3, the second clock signal CLK2 may transit from the logic high level to the logic low level.

In this case, the sixth transistor M6 may be turned on in response to the second clock signal CLK2 of the logic low level, and the second clock signal CLK2 of the logic low level may be applied to the first control node QB through the seventh transistor M7 that is in a turn-on state by the second capacitor C2 and the turned on sixth transistor M6. That is, the first node voltage V_QB may change to have the logic low level.

The ninth transistor M9 may be turned on in response to the first node voltage V_QB of the logic low level, and the first gate voltage VGH may be applied to the output terminal 106 through the first power terminal 107 and the ninth transistor M9. That is, the output voltage V_OUT may change to have the logic high level.

Meanwhile, the thirteenth transistor M13 may be turned on in response to the second clock signal CLK2 of the logic low level, and the first gate voltage VGH applied to the second electrode of the third capacitor C3 through the turned on thirteenth transistor M13 and the twelfth transistor M12 turned on by the second gate voltage VGL may be applied to the second control node Q.

As shown in FIG. 13, when the ninth transistor M9 is turned on, the first gate voltage VGH of the output voltage V_OUT (that is, the emission control signal) of the first stage ST1 is supplied to the output terminal 106. The first gate voltage VGH supplied to the output terminal 106 may be supplied to the first emission control line E1 as the emission control signal.

Thereafter, even though the first control node QB is in a floating state by a change of the first clock signal CLK1 and the second clock signal CLK2, the first node voltage V_QB may be maintained as the logic low level by the first capacitor C1, and the output voltage V_OUT may be maintained as the logic high level.

At a fourth time point t4, the input voltage V_IN may transit from the logic high level to the logic low level.

At a fifth time point t5, the first clock signal CLK1 may transit from the logic high level to the logic low level.

In this case, the first transistor M1 may be turned on in response to the first clock signal CLK1 of the logic low level, and the input voltage V_IN of the logic low level may be applied to the first electrode of the twelfth transistor M12. Because the twelfth transistor M12 is in a turn-on state by the second gate voltage VGL, the input voltage V_IN of the logic low level may be applied to the second control node Q through the twelfth transistor M12.

The tenth transistor M10 may be turned on in response to the second node voltage V_Q of the logic low level, and the second gate voltage VGL may be applied to the output terminal 106.

Meanwhile, the fourth transistor M4 may be turned on by the input voltage V_IN of the logic low level provided through the first transistor M1. In addition, the fifth transistor M5 may be turned on in response to the first clock signal CLK1 of the logic low level, and the second gate voltage VGL (and the first clock signal CLK1) may be applied to the gate electrode of the second transistor M2.

The second transistor M2 may be turned on in response to the second gate voltage VGL, and the first gate voltage VGH may be applied to the first electrode of the third capacitor C3. Because the second electrode of the third capacitor C3 is connected to the second control node Q, the second node voltage V_Q of the logic low level may be applied to the second electrode of the third capacitor C3.

Meanwhile, the eighth transistor M8 may be turned on by the input voltage V_IN of the logic low level, and the first gate voltage VGH may be applied to the first control node QB. That is, the first node voltage V_QB may change to have the logic high level.

At a sixth time point t6, the second clock signal CLK2 may transit from the logic high level to the logic low level.

Because the third transistor M3 is in a turn-on state by the second node voltage V_Q, the second clock signal CLK2 of the logic low level may be applied to the first electrode of the third capacitor C3. The second node voltage V_Q may be boosted by the third capacitor C3, and the second node voltage V_Q may change to have the second logic low level. In addition, the output voltage V_OUT may change to have the logic low level according to the second node voltage V_Q of the second logic low level. Here, the second logic low level may have a voltage level lower than the logic low level, and for example, the second logic low level may have a voltage level lower than the logic low level by the second gate voltage VGL (that is, 2VGL).

Although aspects of some embodiments of the present disclosure have been described in detail in accordance with the above-described embodiments, it should be noted that the above-described embodiments are for the purpose of description and not of limitation. Those skilled in the art may understand that various modifications are possible within the scope of embodiments according to the present disclosure.

What is claimed is:

1. A stage comprising:

a node controller configured to control a voltage of a first control node and a voltage of a second control node, according to a first input signal, a second input signal, and a third input signal;

a node maintenance unit configured to maintain the voltage of the first control node constant, according to a first selection signal and the voltage of the second control node; and an output unit configured to supply a first gate voltage supplied to a first power terminal or a second gate voltage supplied to a second power terminal to an output terminal, according to a second selection signal, the voltage of the first control node, and the voltage of the second control node, wherein the first selection signal is one of the second input signal or a signal having the first gate voltage, and the second selection signal is one of the third input signal or a signal having the second gate voltage.

2. The stage according to claim 1, wherein in a low luminance mode, the first selection signal is the second input signal, and the second selection signal is the third input signal.

3. The stage according to claim 2, wherein in a high luminance mode, the first selection signal is the signal having the first gate voltage, and the second selection signal is the signal having the second gate voltage.

4. The stage according to claim 2, wherein a first input terminal is configured to receive the first input signal, a second input terminal is configured to receive the second input signal, a third input terminal is configured to receive the third input signal, a fourth input terminal is configured to receive the first selection signal, a fifth input terminal is configured to receive the second selection signal, and the node controller comprises:

a first transistor connected between the first input terminal and the second control node and including a first electrode connected to the first input terminal;

a second transistor connected between the first power terminal and the third input terminal and including a first electrode connected to the first power terminal; and a short-circuit prevention transistor connected between the first transistor and the second transistor, and including a first electrode connected to a second electrode of the second transistor and a second electrode connected to a second electrode of the first transistor.

5. The stage according to claim 4, wherein the node controller further comprises:

a third transistor including a first electrode connected to the second electrode of the second transistor, a second electrode connected to the third input terminal, and a gate electrode connected to the second control node;

a fourth transistor including a first electrode connected to a gate electrode of the second transistor, a second electrode connected to the second input terminal, and a gate electrode connected to the second electrode of the first transistor;

a fifth transistor including a first electrode connected to the first electrode of the fourth transistor, a second electrode connected to the second power terminal, and a gate electrode connected to the second input terminal;

a first coupling transistor including a first electrode connected to the first electrode of the fifth transistor, a second electrode, and a gate electrode connected to the second power terminal;

a first coupling capacitor including a first electrode connected to the second electrode of the first coupling transistor, and a second electrode;

a sixth transistor including a first electrode connected to the first control node, a second electrode connected to the second electrode of the first coupling capacitor, and a gate electrode connected to the third input terminal; and a seventh transistor including a first electrode connected to the second electrode of the first coupling capacitor, a second electrode connected to the third input terminal, and a gate electrode connected to the first electrode of the first coupling capacitor.

6. The stage according to claim 5, wherein the node controller further comprises:

a second coupling capacitor including a first electrode connected to the second electrode of the second transistor and a second electrode connected to the gate electrode of the third transistor; and a second coupling transistor connected between the second electrode of the first transistor and the second control node, and configured to be turned on according to the second gate voltage.

7. The stage according to claim 4, wherein the node maintenance unit comprises:

an eighth transistor including a first electrode connected to the fourth input terminal, a second electrode connected to the first control node, and a gate electrode connected to the second electrode of the first transistor; and a first capacitor including a first electrode connected to the first power terminal and a second electrode connected to the first control node.

8. The stage according to claim 4, wherein the output unit comprises:

a pull-up transistor including a first electrode connected to the first power terminal, a second electrode connected to the output terminal, and a gate electrode connected to the first control node; and a pull-down transistor including a first electrode connected to the output terminal, a second electrode connected to the fifth input terminal, and a gate electrode connected to the second control node.

9. The stage according to claim 1, wherein the first gate voltage is set to a gate-off voltage and the second gate voltage is set to a gate-on voltage.

10. The stage according to claim 1, wherein the first input signal is a start pulse or an output signal of a previous stage, and the second input signal and the third input signal are a first clock signal and a second clock signal, respectively.

11. The stage according to claim 10, wherein the first clock signal and the second clock signal alternately have a gate-on voltage, and the start pulse or the output signal of the previous stage is supplied so as to overlap at least one gate-on voltage period of the first clock signal.

12. A display device comprising:

pixels connected to scan lines, data lines, and emission control lines;

a scan driver configured to supply a scan signal to the scan lines;

a data driver configured to supply a data signal to the data lines; and an emission control driver including a plurality of stages configured to supply an emission control signal to the emission control lines, wherein each of the stages comprises:

a node controller configured to control a voltage of a first control node and a voltage of a second control node, according to a first input signal supplied to a first input terminal, a second input signal supplied to a second input terminal, and a third input signal supplied to a third input terminal;

a node maintenance unit configured to maintain the voltage of the first control node constant according to a first selection signal supplied to a fourth input terminal and the voltage of the second control node; and an output unit configured to supply a first gate voltage supplied to the first power terminal or a second gate voltage supplied to a second power terminal to an output terminal, according to a second selection signal supplied to a fifth input terminal, the voltage of the first control node, and the voltage of the second control node, the first selection signal is one of the second input signal or a signal having the first gate voltage, and the second selection signal is one of the third input signal or a signal having the second gate voltage.

13. The display device according to claim 12, wherein in a low luminance mode, the first selection signal is the second input signal, and the second selection signal is the third input signal.

14. The display device according to claim 12, wherein in a high luminance mode, the first selection signal is the signal having the first gate voltage, and the second selection signal is the signal having the second gate voltage.

15. The display device according to claim 12, wherein the node controller further comprises:

a short-circuit prevention transistor connected between the first transistor and the second transistor, and including a first electrode connected to a second electrode of the second transistor and a second electrode connected to the second electrode of the first transistor;

a third transistor including a first electrode connected to the second electrode of the second transistor, a second electrode connected to the third input terminal, and a gate electrode connected to the second control node;

a fourth transistor including a first electrode connected to a gate electrode of the second transistor, a second electrode connected to the second input terminal, and a gate electrode connected to the second electrode of the first transistor;

a fifth transistor including a first electrode connected to the first electrode of the fourth transistor, a second electrode connected to the second power terminal, and a gate electrode connected to the second input terminal;

a first coupling transistor including a first electrode connected to the first electrode of the fifth transistor, a second electrode, and a gate electrode connected to the second power terminal;

a first coupling capacitor including a first electrode connected to the second electrode of the first coupling transistor, and a second electrode;

a sixth transistor including a first electrode connected to the first control node, a second electrode connected to the second electrode of the first coupling capacitor, and a gate electrode connected to the third input terminal; and a seventh transistor including a first electrode connected to the second electrode of the first coupling capacitor, a second electrode connected to the third input terminal, and a gate electrode connected to the first electrode of the first coupling capacitor.

16. The display device according to claim 15, wherein the node controller further comprises:

a second coupling capacitor including a first electrode connected to the second electrode of the second transistor and a second electrode connected to the gate electrode of the third transistor; and a second coupling transistor connected between the second electrode of the first transistor and the second control node, and turned on according to the second gate voltage.

17. The display device according to claim 12, wherein the node maintenance unit further comprises a first capacitor including a first electrode connected to the first power terminal and a second electrode connected to the first control node.

18. The display device according to claim 12, wherein the output unit comprises a pull-up transistor including a first electrode connected to the first power terminal, a second electrode connected to the output terminal, and a gate electrode connected to the first control node.

19. The display device according to claim 12, wherein the first gate voltage is set to a gate-off voltage and the second gate voltage is set to a gate-on voltage.

20. An electronic device comprising the display device of claim 12, wherein the electronic device is one of a digital television (TV), a three-dimensional (3D) TV, a personal computer, a home appliance, a laptop computer, a table computer, a mobile phone, a smartphone, a personal digital assistant, a portable multimedia player, a digital camera, a music player, a portable game console, or a navigation device.

* * * * *